United States Patent
Shinada et al.

(10) Patent No.: US 10,045,171 B2
(45) Date of Patent: Aug. 7, 2018

(54) POSITIONAL INFORMATION MANAGING DEVICE, MOBILE TERMINAL, AND MOBILE DEVICE

(71) Applicant: FUJITSU LIMITED, Kawasaki-shi, Kanagawa (JP)

(72) Inventors: Yuki Shinada, Warabi (JP); Takahiro Kawaguchi, Kamakura (JP); Yoshio Miura, Yokohama (JP); Satoshi Ueda, Yokohama (JP); Noboru Hasegawa, Oota (JP)

(73) Assignee: FUJITSU LIMITED, Kawasaki (JP)

( * ) Notice: Subject to any disclaimer, the term of this patent is extended or adjusted under 35 U.S.C. 154(b) by 3 days.

(21) Appl. No.: 14/949,558

(22) Filed: Nov. 23, 2015

(65) Prior Publication Data

US 2016/0183071 A1 Jun. 23, 2016

(30) Foreign Application Priority Data

Dec. 18, 2014 (JP) ................. 2014-256141

(51) Int. Cl.
| | |
|---|---|
| *H04M 3/00* | (2006.01) |
| *H04W 24/00* | (2009.01) |
| *H04W 4/21* | (2018.01) |
| *H04W 4/20* | (2018.01) |
| *H04W 4/00* | (2018.01) |
| *H04W 76/02* | (2009.01) |
| *H04W 4/70* | (2018.01) |
| *H04W 76/10* | (2018.01) |

(52) U.S. Cl.
CPC ............. *H04W 4/21* (2018.02); *H04W 4/005* (2013.01); *H04W 4/206* (2013.01); *H04W 4/70* (2018.02); *H04W 76/02* (2013.01); *H04W 76/10* (2018.02)

(58) Field of Classification Search
CPC ......... H04W 4/02–4/046; H04W 8/08; H04W 48/04; H04W 60/00; H04W 84/08; H04B 5/00; H04M 1/7253; H04L 67/12
See application file for complete search history.

(56) References Cited

U.S. PATENT DOCUMENTS

| | | | |
|---|---|---|---|
| 6,542,749 B2* | 4/2003 | Tanaka | H04W 76/002 455/41.2 |
| 2003/0078057 A1 | 4/2003 | Watanabe et al. | |
| 2013/0288645 A1* | 10/2013 | Zheng | H04W 72/0446 455/411 |
| 2014/0242983 A1* | 8/2014 | Chang | H04W 4/005 455/434 |
| 2015/0056987 A1* | 2/2015 | Li | H04W 76/023 455/434 |

FOREIGN PATENT DOCUMENTS

| | | |
|---|---|---|
| JP | 2003-106847 A | 4/2003 |
| WO | WO 2009/008043 A1 | 1/2009 |

* cited by examiner

*Primary Examiner* — San Htun
(74) *Attorney, Agent, or Firm* — Arent Fox

(57) ABSTRACT

A positional information managing device includes a processor. The processor is configured to manage first positional information of a first mobile device communicating with a network. The processor is configured to associate device information of a second mobile device connected to the first mobile device with the first positional information. The second mobile device communicates with the network through the first mobile device.

13 Claims, 26 Drawing Sheets

FIG. 12

| TERM | UE ID | POSITIONAL INFORMATION | M2M DEVICE ID #1 | M2M DEVICE ID #2 | ... |
|---|---|---|---|---|---|
| 1 | aaaaaaaa | xxx.xxx.xxx.xxx | oooooooo | | |
| 2 | bbbbbbbb | xxx.xxx.xxx.xxx | | | |
| 3 | cccccccc | xxx.xxx.xxx.xxx | pppppppp | | |
| 4 | dddddddd | xxx.xxx.xxx.xxx | | | |
| 5 | eeeeeeee | xxx.xxx.xxx.xxx | | | |
| 6 | ffffffff | xxx.xxx.xxx.xxx | qqqqqqqq | | |

FIG. 14

| TERM | UE ID | POSITIONAL INFORMATION | M2M DEVICE ID #1 | M2M DEVICE ID #2 | ... |
|---|---|---|---|---|---|
| 1 | aaaaaaaa | yyy.yyy.yyy.yyy | oooooooo | | |
| 2 | bbbbbbbb | xxx.xxx.xxx.xxx | | | |
| 3 | cccccccc | xxx.xxx.xxx.xxx | pppppppp | | |
| 4 | dddddddd | xxx.xxx.xxx.xxx | | | |
| 5 | eeeeeeee | xxx.xxx.xxx.xxx | | | |
| 6 | ffffffff | | qqqqqqqq | | |

| TERM | M2M DEVICE ID | POSITIONAL INFORMATION | ID OF COMMUNICATING UE |
|---|---|---|---|
| 1 | oooooooo | yyy.yyy.yyy.yyy | aaaaaaaa |

FIG. 22

| TERM | UE ID | POSITIONAL INFORMATION | M2M DEVICE ID #1 | M2M DEVICE ID #2 | ... |
|---|---|---|---|---|---|
| 1 | aaaaaaaa | yyy.yyy.yyy.yyy | | | |
| 2 | bbbbbbbb | xxx.xxx.xxx.xxx | | | |
| 3 | cccccccc | xxx.xxx.xxx.xxx | ppppppp | | |
| 4 | dddddddd | xxx.xxx.xxx.xxx | | | |
| 5 | eeeeeeee | xxx.xxx.xxx.xxx | qqqqqqq | | |
| 6 | ffffffff | xxx.xxx.xxx.xxx | | | |
| 7 | oooooooo | yyy.yyy.yyy.yyy | | | |

FIG. 25

| TERM | UE ID | POSITIONAL INFORMATION | M2M DEVICE ID #1 | M2M DEVICE ID #2 | ... |
|---|---|---|---|---|---|
| 1 | aaaaaaaa | yyy.yyy.yyy.yyy | | | |
| 2 | bbbbbbbb | xxx.xxx.xxx.xxx | | | |
| 3 | cccccccc | xxx.xxx.xxx.xxx | ppppppp | | |
| 4 | dddddddd | xxx.xxx.xxx.xxx | | | |
| 5 | eeeeeeee | xxx.xxx.xxx.xxx | | | |
| 6 | ffffffff | xxx.xxx.xxx.xxx | qqqqqqq | | |
| 7 | oooooooo | yyy.yyy.yyy.yyy | | | |

POSITIONAL INFORMATION MANAGING DEVICE, MOBILE TERMINAL, AND MOBILE DEVICE

CROSS-REFERENCE TO RELATED APPLICATION

This application is based upon and claims the benefit of priority of the prior Japanese Patent Application No. 2014-256141, filed on Dec. 18, 2014, the entire contents of which are incorporated herein by reference.

FIELD

The embodiment discussed herein is related to a positional information managing device, a mobile terminal, and a mobile device.

BACKGROUND

In recent years, as in the expression "the Internet of Things (IoT)", a world in which each of various "objects" such as vehicles and consumer electronics is connected to a network and exchanges information with other objects and controls the other objects through the network is developing.

A technique that attracts attention and is used for the IoT is a machine-to-machine (M2M) technique. The M2M technique is a technique for enabling not only information devices such as personal computers (PCs) but also "objects" (or "machines") such as vehicles, consumer electronics, and sensors to be autonomously connected to the network, communicate with each other, exchange information with each other without a person, and automatically control the other devices and the other objects.

The widespread use of the M2M technique is being accelerated since communication devices have been downsized and installed in various "objects" and "machines" (also referred to as "devices"), and radio communication areas have been increased in size because of the development of network infrastructures.

Related techniques are disclosed in, for example, Japanese Laid-open Patent Publication No. 2003-106847 and International Publication Pamphlet No. WO 2009/008043.

The M2M technique has started to be widely used in various fields. For example, M2M services such as a service of remotely monitoring vending machines and a service of remotely monitoring elevators are known. In addition, for example, the following service has started to be widely used: a service of providing, in real time, information such as traffic congestion information and information of available spaces of parking lots through communication devices installed in mobile objects such as vehicles.

Communication methods used for the M2M technique are mainly classified into two. One is a method using radio communication such as Wireless Fidelity (WiFi) (registered trademark), ZigBee (registered trademark), and the like. Since WiFi, ZigBee, and the like are low-power radio communication, a license defined in the Japanese Radio Act does not have to be obtained and a network may be easily built.

The other is a method using networks provided by communication carriers. The networks provided by communication carriers have wide communication coverage areas regardless of whether the areas are indoor or outdoor places, and functions such as security for communication are more reliable than WiFi, ZigBee, and the like.

Thus, for example, it is considered that the networks provided by communication carriers are used for M2M communication to be performed for vending machines located in a wide region or vehicles that are able to move in a wide region or used for M2M communication that is performed for security monitoring or the like and for which high reliability is required.

However, if the number of communication devices (hereinafter also referred to as "M2M devices") that perform M2M communication increases, a load of the network increases. For example, it is considered that the amount of radio resources to be assigned to the M2M communication increases or loads for control, process, or the like in response to a movement of an M2M device increase.

SUMMARY

According to an aspect of the present invention, provided is a positional information managing device including a processor. The processor is configured to manage first positional information of a first mobile device communicating with a network. The processor is configured to associate device information of a second mobile device connected to the first mobile device with the first positional information. The second mobile device communicates with the network through the first mobile device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating an example of positional information management data to be managed by a positional information managing device illustrated in FIG. 9;

FIG. 14 is a diagram illustrating an example of update of positional information management data in a communication operation example of FIG. 13;

FIG. 22 is a diagram illustrating an example of update of positional information management data illustrated in FIG. 12 in a communication operation example of FIG. 21;

FIG. 25 is a diagram illustrating an example of update of positional information management data illustrated in FIG. 12 in a communication operation example of FIG. 24;

DESCRIPTION OF EMBODIMENT

Figure 1:
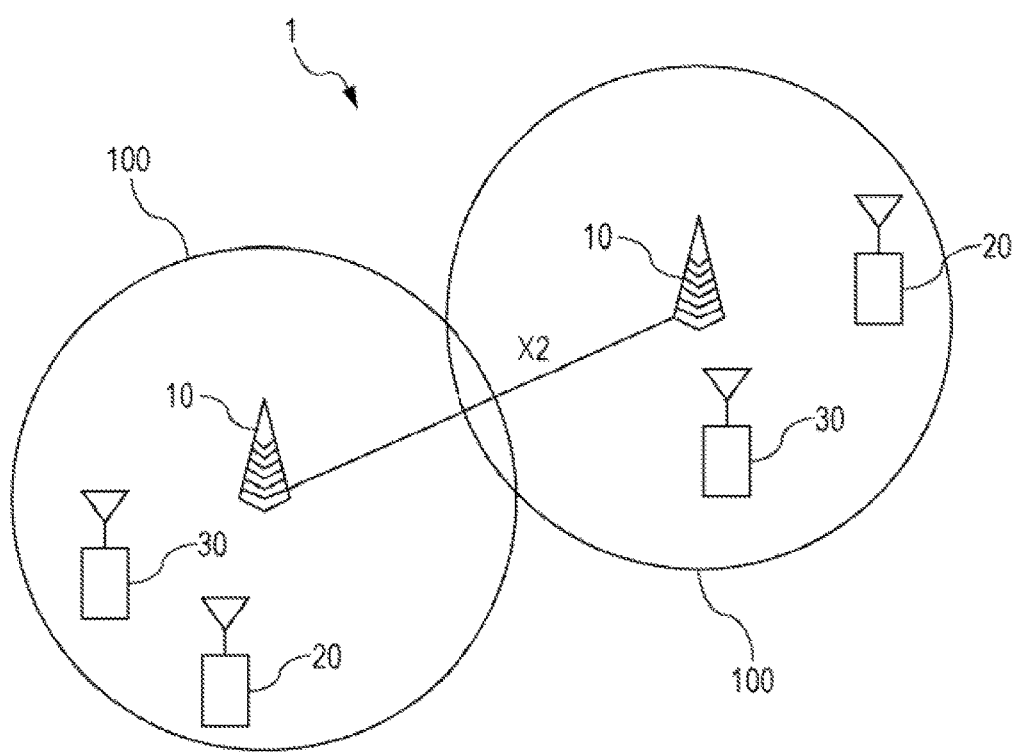
FIG. 1 is a diagram illustrating an example of a configuration of a radio communication system according to an embodiment.

Hereinafter, an embodiment is described with reference to the accompanying drawings. The embodiment described below is an example and is not intended to exclude various modifications and techniques that are not explicitly described. Various illustrated aspects described below may be combined. In the drawings referenced in the description, each of parts indicated by a similar reference numeral is similar to the other parts, unless otherwise specified.

FIG. 1 is a diagram illustrating an example of a configuration of a radio communication system according to the embodiment. A radio communication system 1 illustrated in FIG. 1 includes at least one radio station 10, at least one radio terminal 20, and at least one M2M device 30.

The radio station 10 forms a radio area 100 and may wirelessly communicate with the radio terminal 20 and the M2M device 30 that are located within the radio area 100. The "radio area" may be referred to as a "cell", a "coverage area", or a "communication area".

The "cell" may be divided into "sector cells". The "cell" may include a macro cell and a small cell. The small cell is an example of a cell whose footprint (coverage) is smaller than the macro cell. The small cell may be referred to differently depending on the coverage area. For example, the small cell may be referred to as a "femto cell", a "pico cell", a "micro cell", a "nano cell" a "metro cell", a "home cell", or the like.

The radio station 10 may be referred to as a "base station (BS)", a "node B (NB)", or an "enhanced NB (eNB)".

The radio terminal 20 is an example of radio equipment that may wirelessly communicate with the radio station 10 within the radio area 100. The radio terminal 20 may be referred to as a radio device, a terminal device, or a user equipment (UE). The radio terminal 20 may be a fixed terminal whose position is not changed. The radio terminal 20 may be a mobile terminal (also referred to as "mobile device") whose position is changed. In the embodiment, as an unlimited example, the radio station 10 may be a portable UE such as a mobile phone, a smartphone, or a tablet terminal.

The M2M device 30 is an example of radio equipment that may wirelessly communicate with the radio station 10 within the radio area 100, like the radio terminal 20. The M2M device 30 may be radio equipment that performs communication (M2M communication) without an operation by a person (user).

For example, the M2M device 30 may be a sensor device, a meter (measuring instrument), or the like that has a radio communication function. Alternatively, the M2M device 30 may be radio equipment attached to a mobile object (also referred to as "vehicle") such as a motor vehicle, an airplane, or a ship.

An M2M device 30 that is attached to a "vehicle" such as a motor vehicle may correspond to a "mobile device". Thus, the UE 20 and the M2M device 30 may be collectively referred to as "mobile devices". An M2M device 30 that is attached to a "vehicle" may transmit, to the radio station 10, information indicating a state of the "vehicle".

The information indicating the state of the "vehicle" may be periodically or randomly transmitted. Unlimited examples of the information indicating the state of the "vehicle" are information indicating normality or abnormality (failure) of the "vehicle" and information indicating an operational state of the "vehicle", such as an operating speed or an operation route.

Radio communication between the radio station 10 and the UE 20 and radio communication between the radio station 10 and the M2M device 30 may be referred to as "cellular communication". A radio communication method that conforms to Long Term Evolution (LTE) or LTE-Advanced standardized by the 3rd Generation Partnership Project (3GPP) may be applied to the cellular communication.

Alternatively or additionally, a radio communication method that conforms to another standard such as Worldwide Interoperability for Microwave Access (WiMax) (registered trademark) may be applied to the radio communication between the radio station 10 and the UE 20 and the radio communication between the radio station 10 and the M2M device 30.

Figure 2:
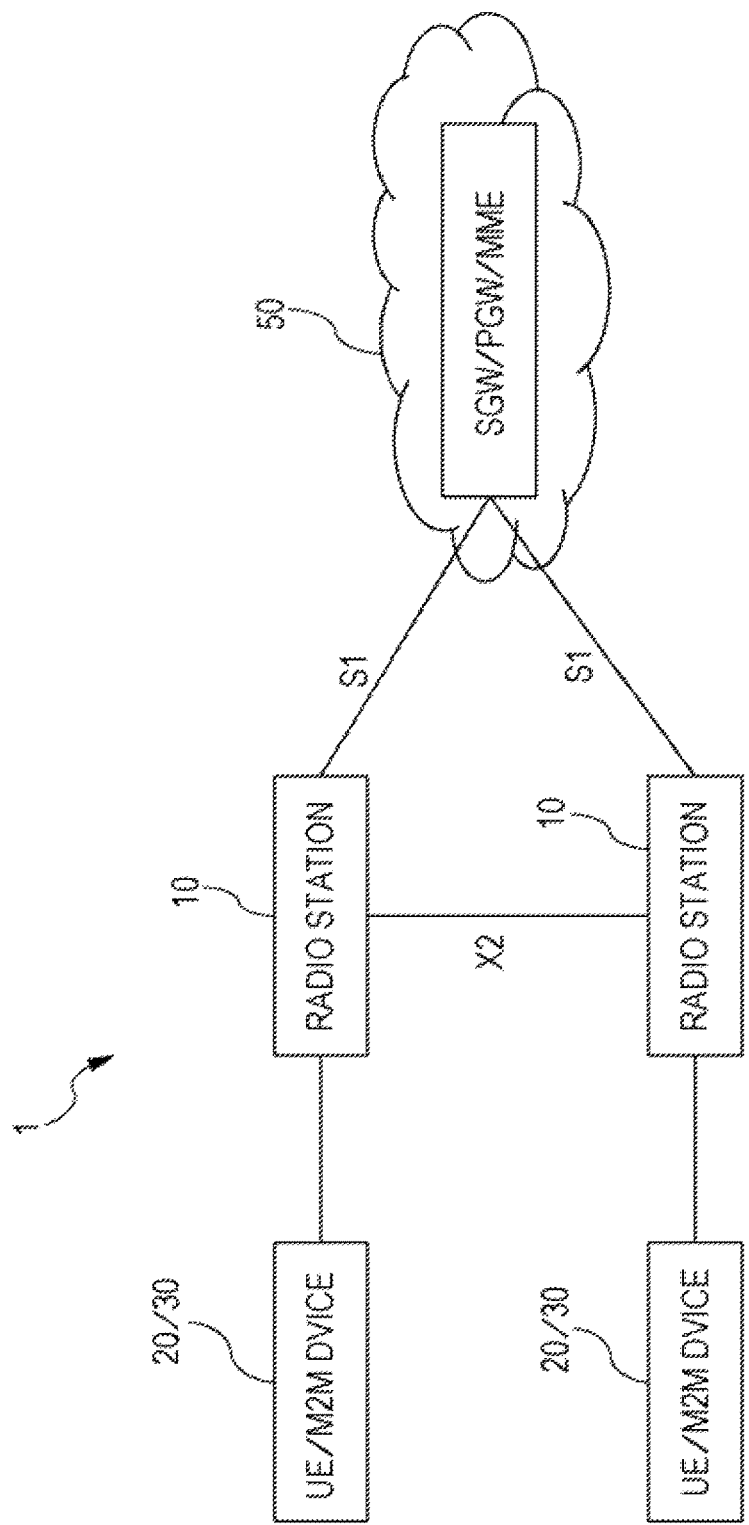
FIG. 2 is a diagram illustrating an example of a configuration of a radio communication system according to an embodiment.

The radio station 10 may be communicably connected to a core network 50 as illustrated in FIG. 2, for example. The core network 50 may include a service gateway (SGW), a packet data network gateway (PGW), a mobility management entity (MME), and the like, as illustrated in FIG. 2.

For example, the SGW may process a user plane signal (in other words, user data). The MME may process a control plane signal (in other words, a control signal). The MME may manage positional information of the UE 20 and M2M device 30 in cooperation with the SGW, for example.

The positional information needs only be capable of identifying geographical positions of the UE 20 and M2M device 30. For example, the positional information may be information of latitudes and longitudes that may be acquired using a global positioning system (GPS). Alternatively, the positional information may be an identifier (cell ID) of the cell to which the UE 20 or the M2M device 30 is connected.

The SGW may control switching between paths for user data in response to movements (for example, handover) of the UE 20 and M2M device 30 on the basis of the positional information managed by the MME, for example. The MME is an example of a positional information managing device.

A communication network that includes the radio station 10 and the core network 50 may be referred to as an "access network". The access network may be referred to as an "evolved universal terrestrial radio access network (E-UTRAN)". An "access network" managed by a certain communication carrier may be referred to as a "communication carrier network".

The radio station 10 may be connected to the core network 50 through a wired interface, for example. The wired interface may be referred to as an "S1 interface". The radio station 10, however, may be communicably connected to the core network 50 by a radio interface.

As Illustrated in FIGS. 1 and 2, the radio station 10 may be communicably connected to another radio station 10 by a wired interface, for example. The wired interface may be referred to as an "X2 interface".

Communication performed through the X2 interface may be referred to as "communication between base stations". Radio communication by a radio interface may be applied to the communication between base stations or may be included in the communication between base stations. The communication between base stations may be performed through a communication device such as a router.

The radio station 10 may assign radio resources to be used for the cellular communication to the UE 20 and the M2M device 30 that are located in the cell 100 formed by the radio station 10. The assignment of radio resources may be referred to as "scheduling".

The UE 20 and the M2M device 30 may use the radio resources assigned by the radio station 10 to perform the cellular communication with the radio station 10. Radio resources may be scheduled for each UE 20 and each M2M device 30 for an uplink (UL) and a downlink (DL).

The radio resources may be each identified by a time and a frequency. For example, the radio resources may be identified by resources obtained by dividing, by a time and a frequency, radio resources available to the radio communication system 1.

The divided resources may be referred to as "resource blocks (RBs)" or "resource elements (REs)". Each of the REs may be the minimum unit of the radio resources to be assigned. Each of the REs may be defined as a single symbol of a single subcarrier, for example.

Multiple REs may form an RE group (REG). In addition, multiple REs may form a single RB. For example, 12 subcarriers of frequency regions×7 or 6 symbols of time regions may form a single RB. Radio resources may be scheduled by the RB.

Figure 3:
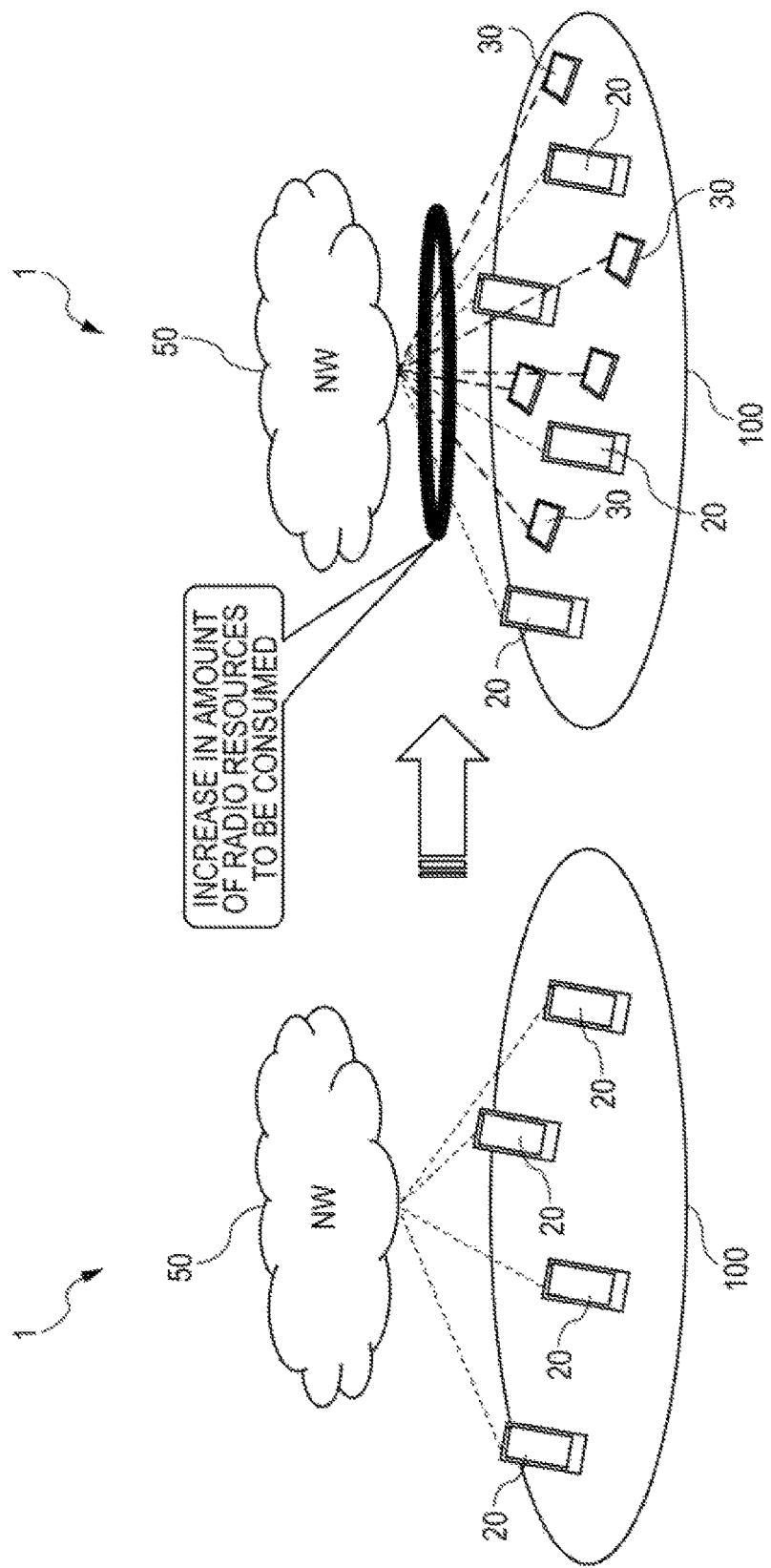
FIG. 3 is a diagram illustrating a state in which the amount of radio resources to be consumed increases with widespread use of M2M devices (or with an increase in the number of M2M devices)

If the M2M technique is widely used and the number of M2M devices 30 increases, as illustrated in FIG. 3, the amount of radio resources to be assigned by the radio station 10 to M2M devices 30 increases. If the amount of radio resources to be assigned to M2M devices 30 increases, a processing load caused by the scheduling of radio resources easily increases, for example.

Figure 4:
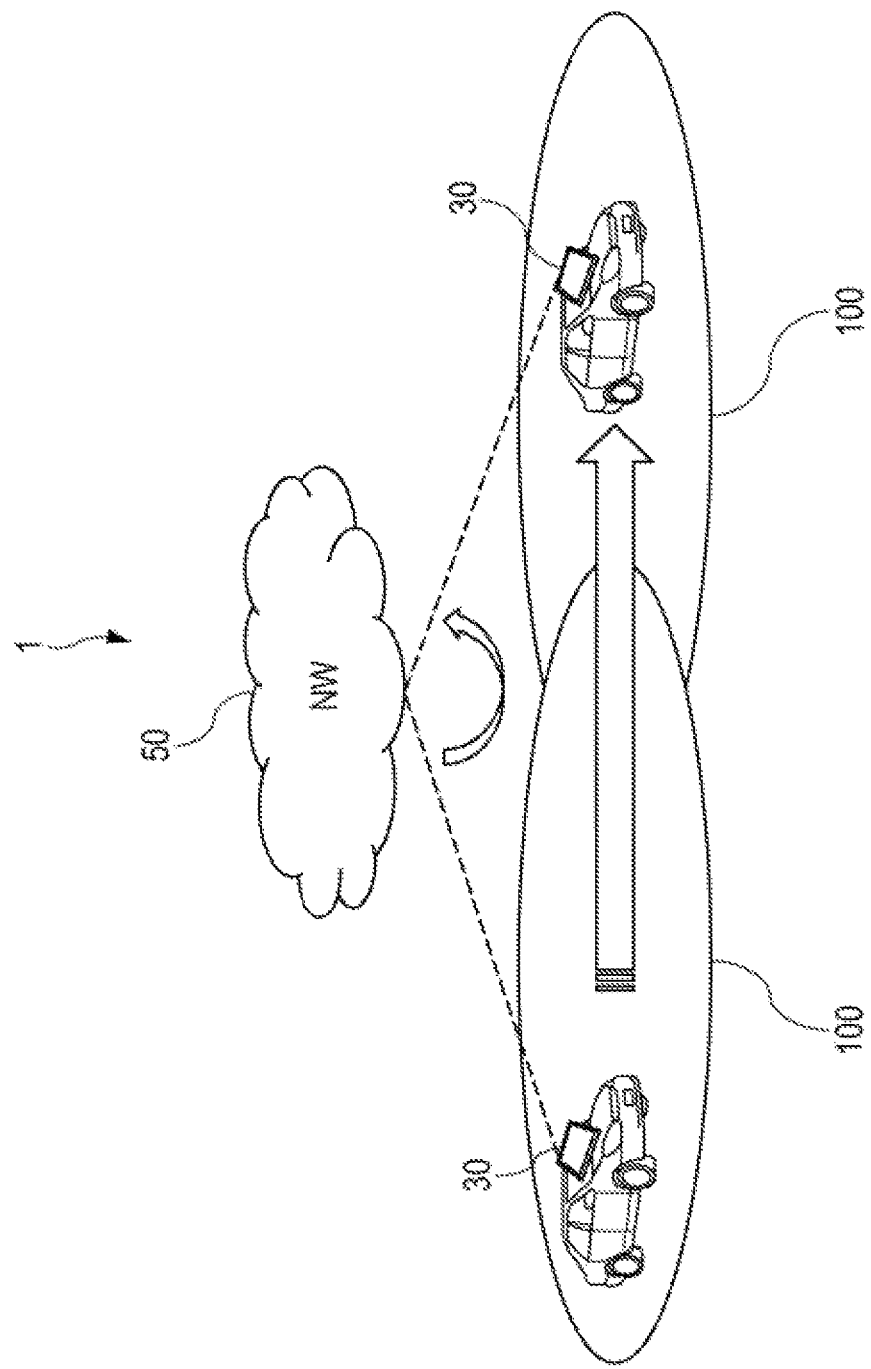
FIG. 4 is a diagram illustrating a state in which movement control and signaling are performed in response to a movement of an M2M device.

For example, as illustrated in FIG. 4, if M2M devices 30 are able to be moved, the number (frequency) of times when movement control such as processing of registering positional information of the M2M devices 30 in the communication carrier network (for example, the MME), path switching, and the like is performed in response to the movements of the M2M devices 30 easily increases with an increase in the number of M2M devices 30. The "path switching" may be referred to as "call switching control".

If the frequency at which the movement control is performed increases, the number of times when a control signal is transmitted or received in the communication carrier network or signaling or the like is performed increases and the processing load in the communication carrier network may easily increase. Thus, a process delay, a failure of a communication device, for example, a network element (NE) such as the MME or the like, that forms the communication carrier network, or the like may occur.

Figure 5:
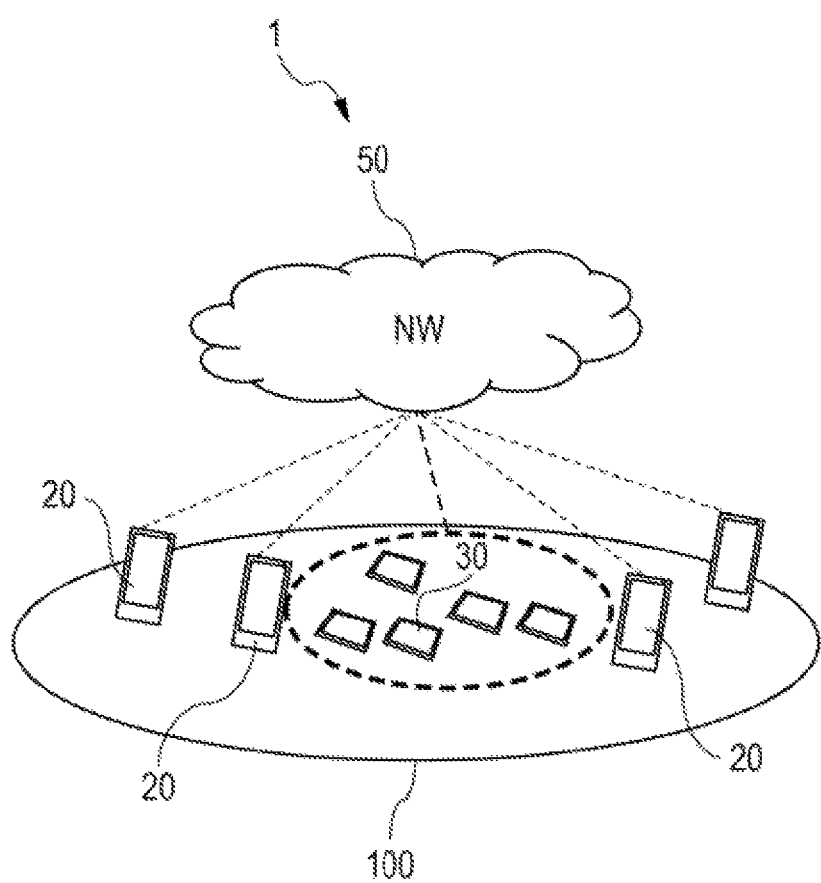
FIG. 5 is a diagram illustrating an example of a method of increasing the efficiency of radio resources to be assigned to M2M devices.

From the perspective of the effective use of radio resources, it is considered that multiple M2M devices 30 are grouped into a single group and that a radio resource is assigned to the group, as illustrated in FIG. 5, for example. The multiple M2M devices 30 that belong to the group may be communicably connected to the communication operation network by a mesh network, for example.

For example, any of the M2M devices 30 that belong to the same group collectively performs communication of the M2M devices 30 with the communication operation network using the assigned radio resource.

In this case, a higher-level communication operation network recognizes the connection of the M2M device 30 that is a representative of the group. Since radio resources are not assigned to the other M2M devices 30, the amount of radio resources to be consumed may be reduced. In other words, the efficiency of using radio resources may be improved.

The grouping of the M2M devices 30, however, may not handle an increase in a frequency (in other words, the number of times when signaling is performed) at which the path switching is performed in response to movements of many M2M devices 30. Thus, a case is considered below where the number of times when the signaling is performed may be reduced even if the number of M2M devices 30 increases.

Figure 6:
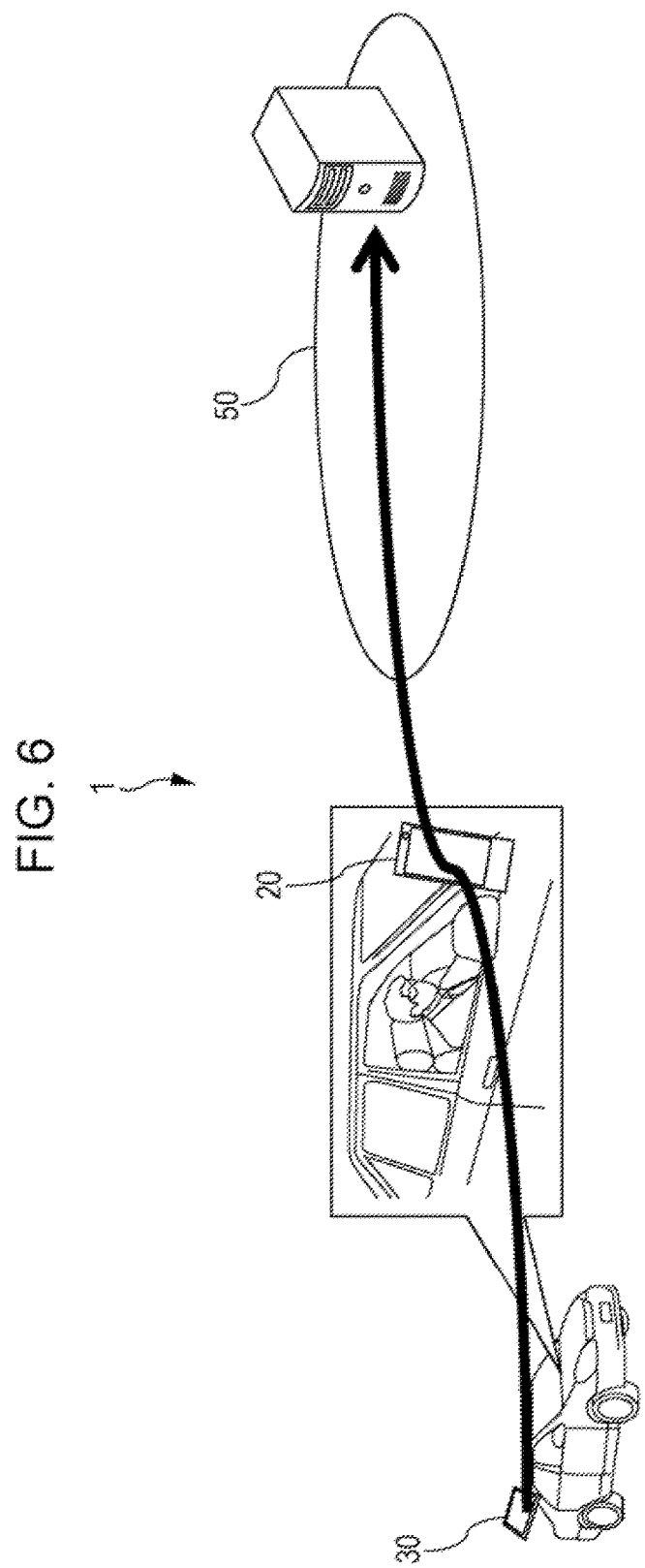
FIG. 6 is a diagram illustrating operations of a radio communication system according to an embodiment.

For example, as illustrated in FIG. 6, an M2M device 30 communicates with an access network using a radio resource assigned to a UE 20 whose position is already registered in the access network.

In other words, the M2M device 30 performs the communication (hereinafter also referred to as "relay communication") with the access network through the UE 20 as a relay point. In addition, the movement control is performed on the M2M device 30 while being associated with (or coordinating with) the movement control to be performed on the UE 20.

Thus, the access network (for example, the MME) manages positional information of the M2M device 30 and the like while associating the M2M device 30 with the UE 20 whose position is already registered in the access network. For example, information (also referred to as "identifier") that identifies the M2M device 30 associated with the UE 20 is added to a signal to be transmitted by the UE 20 to the access network.

Thus, the positional information of the M2M device 30 may be associated with the UE 20 (or synchronized with positional information of the UE 20) and registered in the MME without the signaling.

The positional information of the M2M device 30 is managed while being associated with the UE 20. Thus, even if the relay communication performed through the UE 20 is disconnected or terminated, the M2M device 30 may establish the communication (cellular communication) without newly registering the positional information of the M2M device 30.

Thus, the relay communication performed through the UE 20 may be switched with the minimum process delay to the cellular communication to be performed without the UE 20. Therefore, the M2M device 30 may normally continue to perform the communication with the access network.

In response to the cancellation of the association between the UE 20 and the M2M device 30, the MME may register and manage the M2M device 30 as an M2M device 30 that newly performs the cellular communication. Thus, the MME may manage information equivalent with the positional information registered in the MME by the position registration in order for the M2M device 30 to perform the cellular communication.

Normally, an effect on the communication of the UE 20 may be suppressed by setting a priority of a signal to be transmitted by the M2M device 30 to a level lower than a priority of a signal to be transmitted by the UE 20. Upon an emergency (for example, a failure of the vehicle or the like), the priority of the signal to be transmitted by the M2M device 30 may be set to a level (for example, the top priority) higher than the priority of the signal to be transmitted by the UE 20.

Thus, the M2M device 30 may quickly transmit the signal upon the emergency. The priorities may be determined by the UE 20 that relays the signal transmitted by the M2M device 30. Thus, a load such as congestion of the access network may be suppressed without the addition of a high-class function to the M2M device 30.

A technique that is referred to as a "radio relay technique" may be applied to the relay communication performed through the UE 20 as the relay point. Examples of the "radio relay technique" are a relay technique using a radio local area network (LAN) and relay techniques defined by the 3GPP.

For example, the Layer 1 relay technique, the Layer 2 relay technique, and the Layer 3 relay technique are defined by the 3GPP.

The Layer 1 relay technique using a repeater or the like is a technique for amplifying power of a signal to be transmitted and received between a radio station and a mobile device and transmitting the amplified signal to the radio station and the mobile device, for example. The Layer 1 relay technique is used in order to improve coverage areas such as mountain areas and indoor areas. The Layer 1 relay technique may be affected by noise and interference with another cell and may amplify noise and the like as well as the received signal.

The Layer 2 relay technique is a technique for demodulating and decoding a signal received from a radio station, encoding and modulating the received signal after the demodulation and the decoding, and transmitting the signal to a mobile device, for example. Effects of noise, interference with another cell, and the like in the Layer 1 relay technique may be avoided in the Layer 2 relay technique. A process delay, however, may easily occur due to the modulation and demodulation processing and the coding and decoding processing in the Layer 2 relay technique, compared with the Layer 1 relay technique.

The Layer 3 relay technique performs processing such as a disguising and dividing user data, as well as demodulating and decoding a signal received from a radio station. Resistance to noise, interference with another cell, and the like may be improved in the Layer 3 relay technique, like the Layer 2 relay technique. In the Layer 3 relay technique, security such as protection against eavesdropping may be easily improved by the disguise.

However, throughput increases in the Layer 3 relay technique, compared with the Layer 1 relay technique and the Layer 2 relay technique. Thus, a process delay may easily occur in the Layer 3 relay technique. The Layer 3 relay technique may be achieved by using a function that is the same as or similar to a function included in the radio station.

Operations in first and second use cases are described below as operations according to the embodiment. The two cases assume that the M2M device 30 is installed in a vehicle such as a motor vehicle and that a user (for example, a driver) who gets in the vehicle carries the UE 20.

In the first use case, the in-vehicle M2M device 30 is in an ON state and communicates with the access network, regardless of whether or not the vehicle is stopped (an engine of the vehicle is being turned off) and whether or not the user is separated from the vehicle (or absent).

For example, it is considered that information that indicates the state of the vehicle, such as whether or not the vehicle has a failure, is transmitted to the access network in order to remotely monitor or manage the vehicle, regardless of whether or not the vehicle is stopped and whether or not the user is absent.

A scene 7a Illustrated in FIG. 7 exemplifies a state in which the vehicle is stopped (the engine is being turned off), the user is absent, and the M2M device 30 performs the cellular communication with the access network (hereinafter also merely referred to as "network (NW)").

Figure 7:
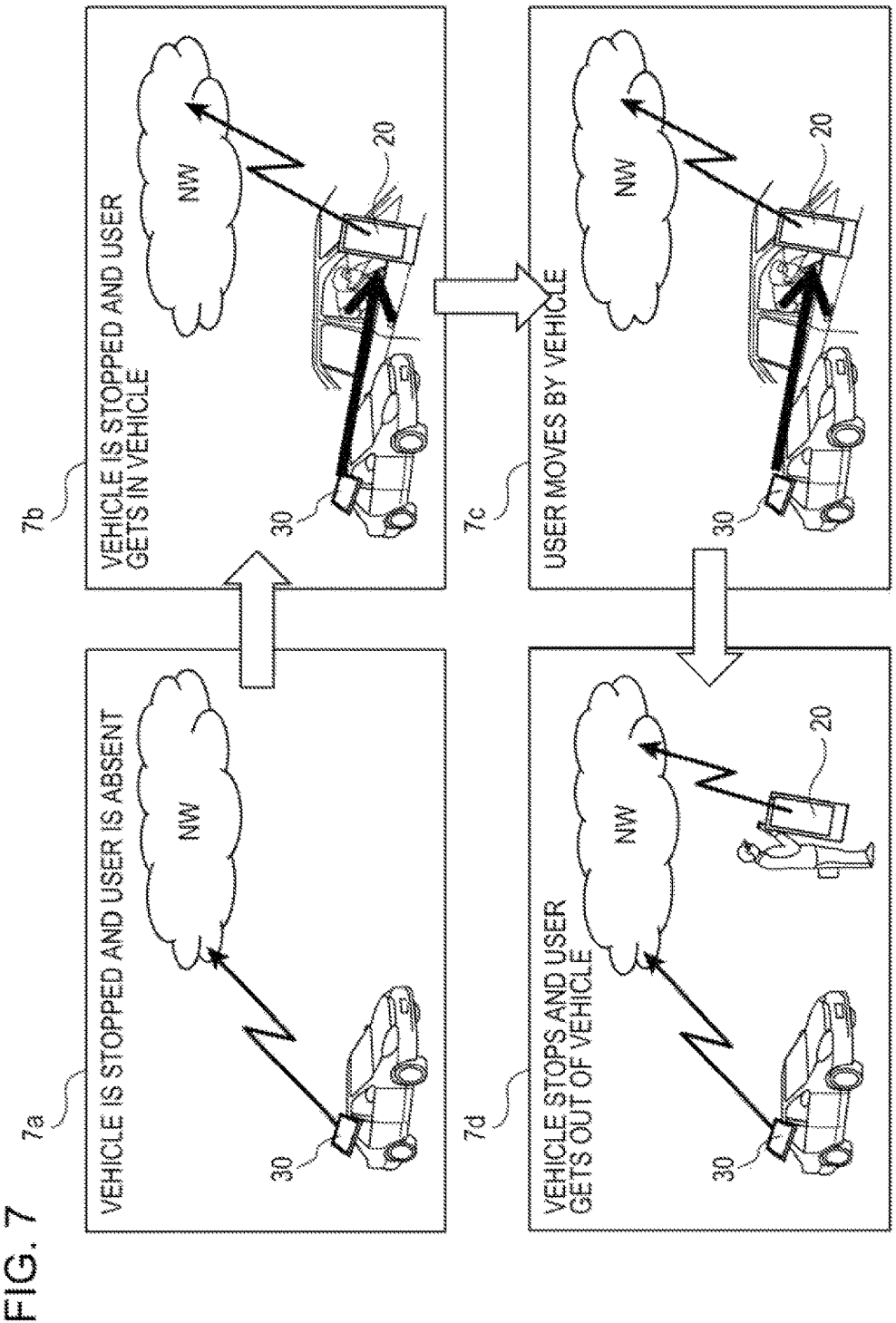
FIG. 7 is a diagram illustrating a communication operation example of a radio communication system according to an embodiment in a first use case.

A scene 7b illustrated in FIG. 7 exemplifies a communication operation example in which the in-vehicle M2M device 30 communicates with the NW when the user carrying the UE 20 gets in the vehicle that is stopped. For example, when detecting the UE 20 upon the riding of the user in the vehicle, the in-vehicle M2M device 30 releases a radio link (for example, connection setting and a radio resource) of the cellular communication. Alternatively, the in-vehicle M2M device 30 sets a radio link (connection) between the in-vehicle M2M device 30 and the UE 20 serving as the relay point and communicates with the NW using a radio resource assigned to the UE 20. The NW associates the UE 20 with the in-vehicle M2M device 30 and manages the in-vehicle M2M device 30 on the basis of the identifier of the in-vehicle M2M device 30, which is included in a signal received from the UE 20.

A scene 7c illustrated in FIG. 7 exemplifies a communication operation example in which the in-vehicle M2M device 30 communicates with the NW while the user moves by the vehicle (traveling). For example, when the UE 20 is moved along with the movement of the vehicle and the positional information of the UE 20 is updated, the positional information of the in-vehicle M2M device 30 is also updated together with the update of the positional information of the UE 20 in the NW (MME).

A scene 7d illustrated in FIG. 7 exemplifies a communication operation example in which the vehicle stops (the engine is turned off) and the in-vehicle M2M device 30 communicates with the NW when the user gets out of the vehicle. For example, when the user gets out of the vehicle, the radio link between the M2M device 30 and the UE 20 is disconnected and the connection setting is cancelled.

In response to the cancellation, the NW (MME) takes over, as the positional information of the in-vehicle M2M device 30, the positional information associated with the UE 20 and managed. Thus, even if the communication performed through the UE 20 is disconnected or terminated and the association (connection) between the in-vehicle M2M device 30 and the UE 20 is cancelled, the in-vehicle M2M device 30 may establish the communication between the in-vehicle M2M device 30 and the NW without registering the positional information of the in-vehicle M2M device 30 in the NW.

The UE 20 may notify the NW of the cancellation of the setting of the connection between the in-vehicle M2M device 30 and the UE 20. Alternatively, the in-vehicle M2M device 30 may notify, through the UE 20, the NW of the cancellation of the setting of the connection between the in-vehicle M2M device 30 and the UE 20 before the cancellation of the setting of the connection.

In the second use case, during the time when the vehicle is stopped (the engine is in an OFF state), a power supply of the in-vehicle M2M device 30 is in an OFF state and the in-vehicle M2M device 30 does not perform the cellular communication with the NW.

For example, it is sufficient if information when the vehicle moves (the engine is in an ON state) is acquired for the management of traffic situations and the like, and it is considered that the in-vehicle M2M device 30 is not expected to communicate with the NW when the engine of the vehicle is in the OFF state.

When communication is not performed, the in-vehicle M2M device 30 may be in the power OFF state (or in a sleep mode). Thus, power to be consumed by the in-vehicle M2M device 30 may be saved and battery life may be extended.

Figure 8:
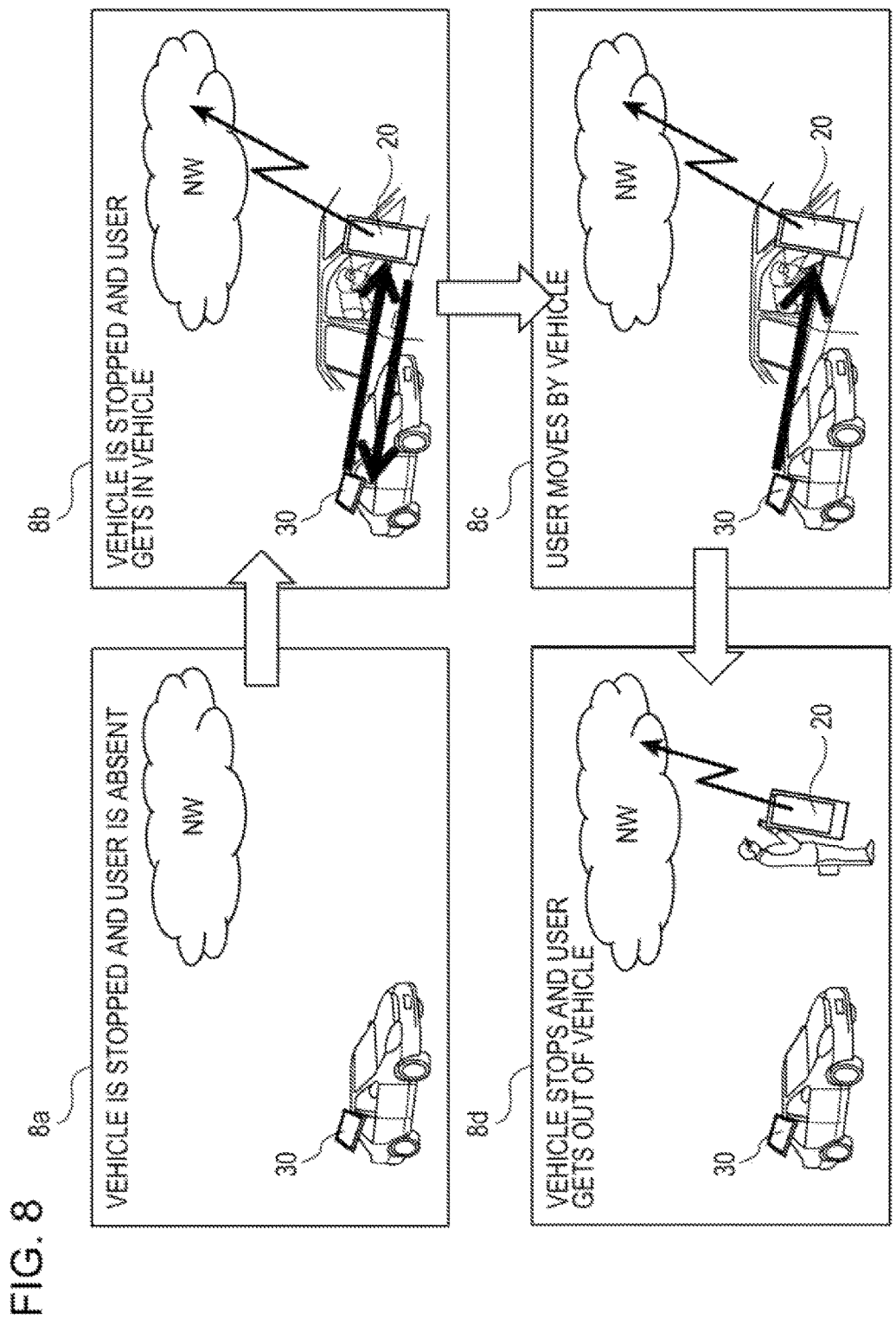
FIG. 8 is a diagram illustrating a communication operation example of a radio communication system according to an embodiment in a second use case.

A scene 8a illustrated in FIG. 8 exemplifies a state in which the power supply of the in-vehicle M2M device 30 is turned off and the M2M device 30 does not perform the cellular communication with the NW when the vehicle is stopped (the engine is in the OFF state).

A scene 8b illustrated in FIG. 8 exemplifies a communication operation example in which the in-vehicle M2M device 30 communicates with the NW when the user gets in the stopped vehicle and the engine is turned on. For example, in response to the turning-on of the engine of the vehicle, the power supply of the in-vehicle M2M device 30 is turned on and the in-vehicle M2M device 30 searches for a UE 20 located near the in-vehicle M2M device 30. If the in-vehicle M2M device 30 detects the UE 20 of the user staying in the vehicle, the in-vehicle M2M device 30 acquires current positional information from the UE 20 and may skip the registration of the positional information in the NW.

Then, the in-vehicle M2M device 30 uses the radio resource assigned to the UE 20 to communicate with the NW through the UE 20 that serves as the relay point and whose position is already registered in the NW. The NW associates the UE 20 with the in-vehicle M2M device 30 and manages the in-vehicle M2M device 30 on the basis of the identifier of the in-vehicle M2M device 30, which is included in a signal received from the UE 20.

A scene 8c illustrated in FIG. 8 exemplifies a communication operation example in which the in-vehicle M2M device 30 communicates with the NW while the user moves by the vehicle (traveling). The communication operation example illustrated by the scene 8c is the same as or similar to the communication operation example of the scene 7c illustrated in FIG. 7. For example, when the UE 20 is moved along with the movement of the vehicle and the positional information of the UE 20 is updated, the positional information of the in-vehicle M2M device 30 is also updated together with the update of the positional information of the UE 20 in the NW (MME).

A scene 8d illustrated in FIG. 8 exemplifies a communication operation example in which the in-vehicle M2M device 30 communicates with the NW when the vehicle stops (the engine is turned off) and the user gets out of the vehicle. For example, in response to the stop of the vehicle (the turning-off of the engine), the power supply of the in-vehicle M2M device 30 is turned off and the radio link (connection setting) between the in-vehicle M2M device 30 and the UE 20 serving as the relay point is cancelled.

In response to the cancellation of the connection setting, the NW (MME) may delete the positional information of the M2M device 30 that is managed while being associated with the UE 20. The UE 20 may notify the NW of the cancellation of the connection setting between the in-vehicle M2M device 30 and the UE 20, for example. Alternatively, before the power supply of the in-vehicle M2M device 30 is turned off, the in-vehicle M2M device 30 may notify the NW through the UE 20 that the connection setting is cancelled.

In both first and second use cases illustrated in FIGS. 7 and 8, the number of in-vehicle M2M devices 30 installed in the single vehicle is not limited to one and may be two or more. It is considered that each of multiple M2M devices 30 individually performs any of the communication operations illustrated in FIGS. 7 and 8.

Thus, the communication operations of the two patterns illustrated in FIGS. 7 and 8 may be individually controlled for each M2M device 30 and may be controlled for multiple M2M devices 30.

The following case is also considered: multiple users get in the vehicle or multiple candidates for the UE 20 serving as the relay point and to be connected to the in-vehicle M2M device 30 (connection setting) exist.

In this case, the M2M device 30 may set a connection between the M2M device 30 and a predetermined UE 20 (for example, the UE 20 carried by the driver). Alternatively, the M2M device 30 may dynamically select a UE 20 to be subjected to the connection setting in accordance with a predetermined rule or requirement.

Next, with reference to FIG. 9, an example of a functional configuration of the radio communication system 1 that may achieve the communication operations described with reference to FIGS. 7 and 8 is described.

Figure 9:
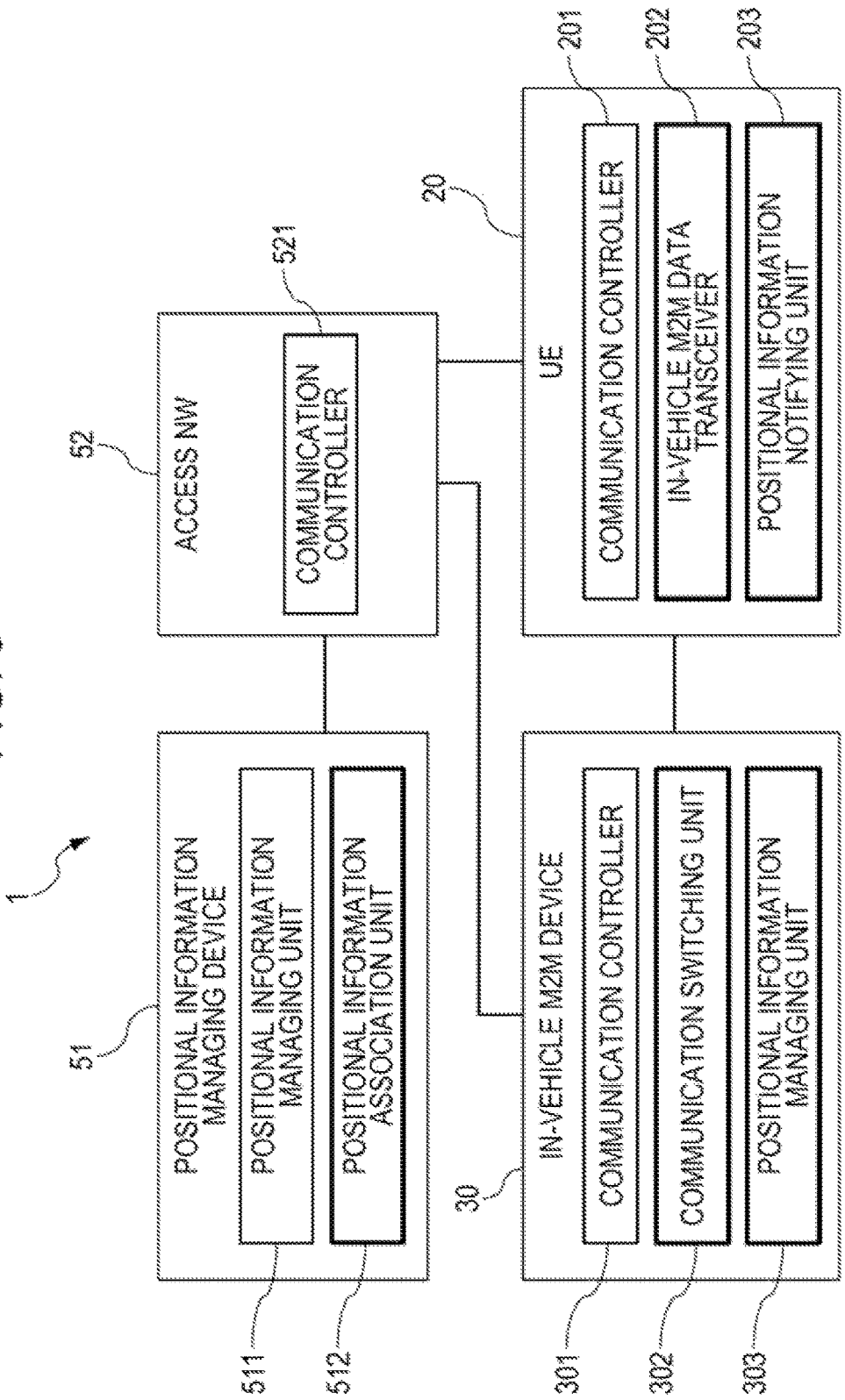
FIG. 9 is a diagram illustrating an example of a functional configuration of a radio communication system illustrated in FIG. 1.

The radio communication system 1 illustrated in FIG. 9 includes the aforementioned UE 20, the aforementioned in-vehicle M2M device 30, a positional information managing device 51, and an access network 52, for example. The positional information managing device 51 corresponds to the aforementioned MME, for example. The access network 52 may include the aforementioned radio station 10, the SGW, and the PGW. The positional information managing device 51 may be included in the access network 52.

As illustrated in FIG. 9, the UE 20 includes a communication controller 201, an in-vehicle M2M data transceiver 202, and a positional information notifying unit 203, for example.

The in-vehicle M2M device 30 includes a communication controller 301, a communication switching unit 302, and a positional information managing unit 303, for example.

The positional information managing device 51 includes a positional information managing unit 511 and a positional information association unit 512, for example.

The access network 52 includes a communication controller 521.

The communication controller 201 of the UE 20 controls the cellular communication between the UE 20 and the access network 52, for example. The control of the cellular communication may include registration of positional information in the positional information managing device 51 in response to a movement of the UE 20, transmission and reception of a signal using a radio resource assigned to the UE 20 from the access network 52. Thus, the communication controller 201 may be referred to as a "cellular communication controller 201".

The in-vehicle M2M data transceiver 202 of the UE 20 sets a connection between the UE 20 and the in-vehicle M2M device 30, for example. The connection setting may be performed in accordance with a request provided by the in-vehicle M2M device 30 or in accordance with a request provided by the UE 20 to the in-vehicle M2M device 30.

In addition, the in-vehicle M2M data transceiver 202 relays communication between the in-vehicle M2M device 30 connected (connection setting) to the UE 20 and the access network 52 in cooperation with the communication controller 201.

For example, the in-vehicle M2M data transceiver 202 receives a signal transmitted from the in-vehicle M2M device 30 and transmits the received signal to the access network 52. In addition, the in-vehicle M2M data transceiver 202 transmits, to the in-vehicle M2M device 30, a signal received from the access network 52 and to be directed to the in-vehicle M2M device 30.

Thus, the in-vehicle M2M data transceiver 202 may be referred to as a "relay communication controller 202" which controls the relay communication between the in-vehicle M2M device 30 and the access network 52 through the UE 20.

The positional information notifying unit 203 of the UE 20 notifies the in-vehicle M2M device 30 of the positional information of the UE 20, which is set the connection with the UE 20. The positional information of the UE 20 is dynamically updated in response to a movement of the UE 20 and notified to the positional information managing device 51 by the position registration performed by the communication controller 201.

The positional information notifying unit 203 notifies the M2M device 30 of the positional information which is notified to the positional information managing device 51. Thus, the positional information of the UE 20 may be synchronized between the positional information managing device 51 and the M2M device 30.

The communication controller 301 of the in-vehicle M2M device 30 controls the cellular communication between the in-vehicle M2M device 30 and the access network 52, like the communication controller 201 of the UE 20. The control of the cellular communication may include registration of positional information of the in-vehicle M2M device 30 in the positional information managing device 51 in response to a movement of the in-vehicle M2M device 30, transmission and reception of a signal using a radio resource assigned to the in-vehicle M2M device 30 from the access network 52, and the like. The communication controller 301 may be referred to as a "cellular communication controller 301".

The communication switching unit 302 of the in-vehicle M2M device 30 switches between the cellular communication performed under control by the communication controller 301 and the relay communication performed between the in-vehicle M2M device 30 and the access network 52 through the UE 20. The switching between the cellular communication and the relay communication may correspond to switching between communication modes (or selection of a communication mode). The communication switching unit 302 may try to establish (start) the relay communication through the UE 20 before trying to establish the cellular communication. The communication switching unit 302 may be referred to as a "relay communication controller 302".

The positional information managing unit 303 of the in-vehicle M2M device 30 manages the positional information of the UE 20, which is notified by the positional information notifying unit 203. As described above, the positional information managed by the positional information managing unit 303 may be synchronized with the positional information managed by the positional information managing device 51.

Thus, even if the connection setting between the in-vehicle M2M device 30 and the UE 20 is cancelled, the in-vehicle M2M device 30 may control the establishment of the cellular communication between the in-vehicle M2M device 30 and the access network 52 on the basis of the positional information managed by the positional information managing unit 303. In other words, the in-vehicle M2M device 30 may skip registration of the positional information of the in-vehicle M2M device 30 in the positional information managing device 51.

The positional information managing unit 511 of the positional information managing device 51 manages the positional information of the UE 20 and manages the identifier of an M2M device 30 associated with the UE 20 by the positional information association unit 512.

The positional information association unit 512 associates the identifier of the M2M device 30 with the positional information of the UE 20, which is managed by the positional information managing unit 511, on the basis of the identifiers of the UE 20 and M2M device 30, which are notified by the access network 52. The positional information association unit 512 may be an example of a controller configured to control the management of the positional information, which is to be performed by the positional information managing unit 511.

The communication controller 521 of the access network 52 controls the communication between the access network 52 and the mobile device 20 (and mobile device 30) on the basis of the positional information of the mobile device 20 (and mobile device 30), which is managed by the positional information managing device 51. The communication controller 521 may correspond to the aforementioned SGW and PGW. The communication controller 521 may be referred to as a "cellular communication controller 521".

Next, the communication operation example in the first use case illustrated in FIG. 7 is described in detail with reference to FIGS. 10 to 16.

Figure 10:
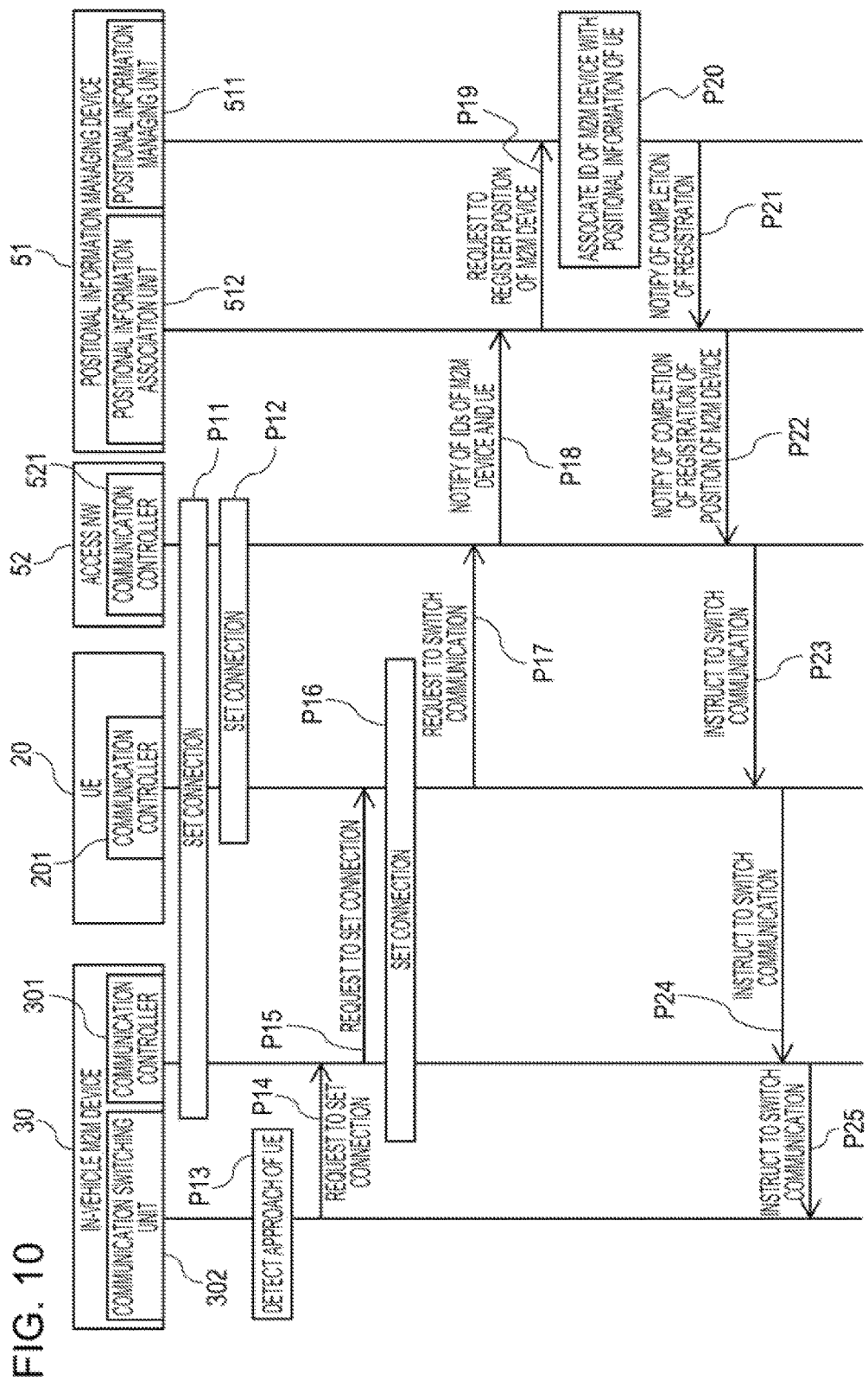
FIG. 10 is a sequence diagram illustrating a communication operation example of a radio communication system illustrated in FIG. 9 in a first use case (when a user gets in a vehicle)

FIG. 10 is a sequence diagram illustrating the communication operation example when the user carrying the UE 20 gets in the stopped vehicle, as illustrated by the scenes 7a and 7b illustrated in FIG. 7. In the first use case, the power supply of the in-vehicle M2M device 30 is always in the ON state and the in-vehicle M2M device 30 is able to communicate with the access network 52 regardless of whether or not the user stays in the vehicle.

In other words, as illustrated in FIG. 10, a connection between the in-vehicle M2M device 30 and the access network 52 is already set (in P11). In addition, it is assumed that a connection between the UE 20 carried by the user of the vehicle and the access network 52 is already set (in P12).

In this state, when the user approaches the vehicle in order to get in the stopped vehicle, the in-vehicle M2M device 30 detects the approach of the UE 20 carried by the user (in P13). The communication switching unit 302 illustrated in FIG. 9 may detect the approach of the UE 20, for example. A method of detecting the approach is not limited. For example, a known terminal discovery technique or the like may be applied to the method of detecting the approach.

Upon detecting the approach of the UE 20, the in-vehicle M2M device 30 transmits, to the UE 20, a request to set a connection (in P14 and P15). The request to set the connection may be generated by the communication switching unit 302 and transmitted by the communication controller 301 to the UE 20, for example.

Upon receiving the request to set the connection from the in-vehicle M2M device 30, the UE 20 sets the connection between the UE 20 and the in-vehicle M2M device 30 that is a source of the request to set the connection (in P16). The communication controller 201 of the UE 20 and the communication controller 301 of the in-vehicle M2M device 30 may set the connection in cooperation with each other, for example.

When the connection setting is completed, the in-vehicle M2M device 30 becomes able to directly communicate with the UE 20. WiFi communication, Bluetooth (registered trademark) communication, or the like may be applied to the direct communication between the in-vehicle M2M device 30 and the UE 20. The direct communication between the in-vehicle M2M device 30 and the UE 20, however, is not limited to them.

When the connection between the in-vehicle M2M device 30 and the UE 20 is set, the UE 20 may transmit, to the access network 52, a request to switch the communication (in P17). The request to switch the communication is an example of a signal indicating that the in-vehicle M2M device 30 requests the switching of the direct communication between the in-vehicle M2M device 30 and the access network 52 to the direct communication between the in-vehicle M2M device 30 and the UE 20.

The request to switch the communication may be generated by the communication controller 201 and may include the identifiers of the UE 20 and in-vehicle M2M device 30, for example. In other words, the request to switch the communication is an example of a signal that notifies the access network 52 of the identifiers of the UE 20 and in-vehicle M2M device 30.

The identifier of the in-vehicle M2M device 30 may be acquired and stored by the UE 20 through the setting processing of the connection in P16. For example, in response to the connection setting, the in-vehicle M2M device 30 (communication controller 301) may transmit, to the UE 20, information (identifier) to be associated with the positional information of the UE 20 by the positional information managing device 51. The identifier of the UE 20 may be represented by an "UE ID", while the identifier of the in-vehicle M2M device 30 may be represented by an "M2M device ID".

The request to switch the communication that is the example of the signal that notifies the access network 52 of the UE ID and the M2M device ID may be transmitted with a user plane signal. An example of the user plane signal is a general packet radio service (GPRS) tunneling protocol for user plane (GTP) signal (also referred to as "packet").

Figure 11:
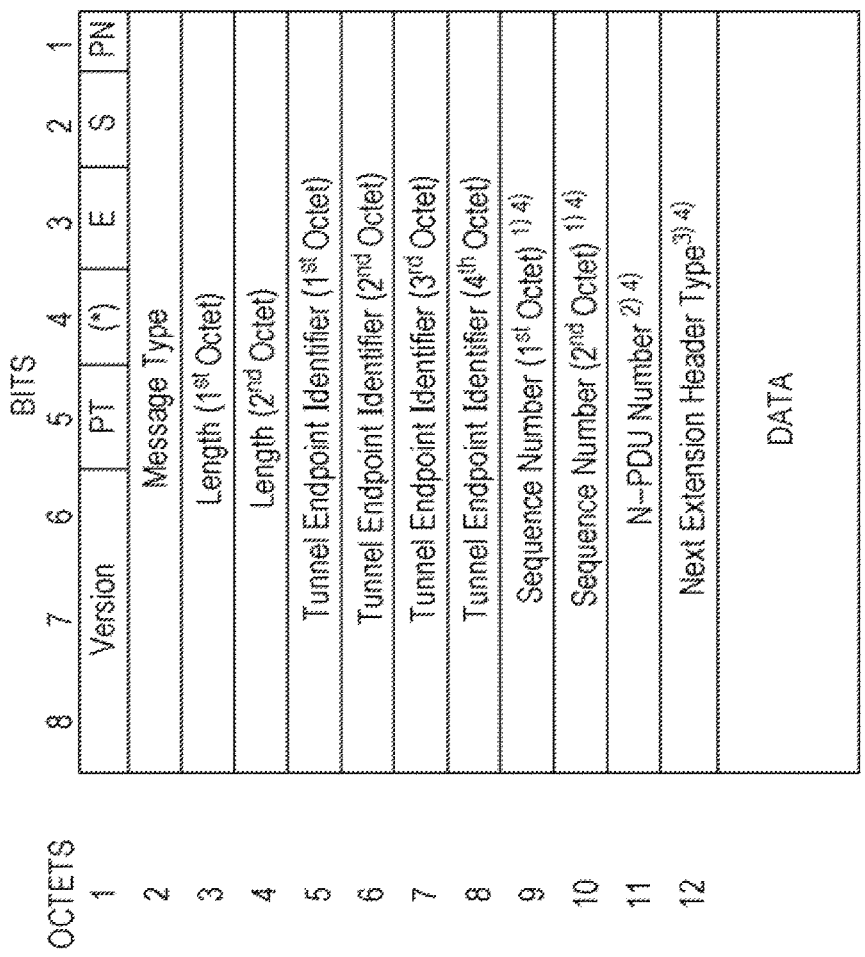
FIG. 11 is a diagram illustrating an example of a format of a GTP packet, which is an example of a user plane signal used to notify of identifiers of a UE and M2M device, in a communication operation example of FIG. 10.

An example of the formal of the GTP packet is illustrated in FIG. 11. As illustrated in FIG. 11, a "Message Type" field (of 8 bits) that indicates the type of the GTP packet is defined in the second octet of the GTP packet.

A value that indicates that the UE ID and the M2M device ID are added to the GTP packet may be selected from reserved values of the "Message Type" field. For example, if the reserved values of the 8-bit field is 3 to 25, 27 to 30, and 32 to 253, any (for example, 253) of these values may be assigned to the value indicating that the UE ID and the M2M device ID are added to the GTP packet.

The UE ID and M2M device ID themselves may be set in a DATA field (also referred to as "payload field") of the GTP packet. For example, as illustrated in FIG. 11, the UE ID and the M2M device XD may be set in the DATA field (of the 13th octet and later) following the header of the GTP user-plane packet (GTP-U packet). Since a device that receives the GTP-U packet may identify, on the basis of the header information of the GTP-U packet, the UE with which the device is communicating and which is a source of the packet, it is not indispensable to set the UE ID in the DATA field of the GTP packet.

By using a user plane signal (for example, a GTP packet) for the notification of the M2M device ID, the occurrence of new signaling using a control plane signal may be suppressed and a processing load of the access network 52 may be reduced.

Upon receiving the user plane signal having the UE ID and the M2M device ID added thereto from the UE 20, the access network 52 notifies the positional information managing device 51 of the IDs added to the user plane signal (in P18). The IDs may be notified by the communication controller 521 of the access network 52.

Upon receiving the M2M device ID and the UE ID, the positional information managing device 51 associates the notified M2M device ID with the positional information of the UE 20, which is intrinsically managed by the positional information managing unit 511 to register and manage the M2M device ID (in P19 and P20), for example. An example of positional information management data is illustrated in FIG. 12.

In the example illustrated in FIG. 12, three M2M devices 30 with M2M device IDs "oooooooo", "pppppppp", and "qqqqqqqq" are associated with positional information of three UEs 20 with UE IDs "aaaaaaaa", "cccccccc", and "ffffff", respectively. Positional information "xxx.xxx.xxx.xxx" indicates arbitrary positional information. The example illustrated in FIG. 12 does not indicate that positional information of six UEs 20 is the same.

In the example illustrated in FIG. 12, multiple M2M devices 30 may be associated with a single UE 20 and managed in the positional information management data. For example, if multiple M2M devices 30 are installed in a vehicle, the multiple M2M devices 30 may be associated with a single UE 20 and managed.

Upon completing the registration (association) of M2M device ID, the positional information managing device 51 transmits a registration completion notification to the access network 52 (in P21 and P22).

Upon receiving the registration completion notification from the positional information managing device 51, the access network 52 (communication controller 521) transmits, to the UE 20, an instruction to switch the cellular communication of the in-vehicle M2M device 30 to the direct communication with the UE 20 (in P23).

Upon receiving the instruction to switch the communication from the access network 52, the communication controller 201 of the UE 20 transmits an instruction to switch the communication to the communication controller 301 of the in-vehicle M2M device 30 (in P24), for example.

When the communication controller 301 receives the instruction to switch the communication from the UE 20, the in-vehicle M2M device 30 releases the connection setting of the cellular communication between the in-vehicle M2M device 30 and the access network 52, and the communication switching unit 302 switches the cellular communication to the direct communication with the UE 20 (in P25).

After that, the in-vehicle M2M device 30 communicates with the access network 52 through the UE 20 serving as the relay point.

In P13 illustrated in FIG. 10, the M2M device 30 transmits, to the UE 20, the request to set the connection upon detecting the approach of the UE 20, but may transmit, to the UE 20, the request to set the connection in accordance with another requirement.

For example, the M2M device 30 may transmit, to the UE 20, the request to set the connection when the engine of the vehicle is in the ON state and the UE 20 is continuously located near the vehicle for a certain time period or more.

Thus, it may be possible to suppress the fact that the request to set the connection is frequently transmitted from the in-vehicle M2M device 30 to the UE 20 every time the user approaches the vehicle.

In P13 illustrated in FIG. 10, multiple UEs 20 may approach the in-vehicle M2M device 30. In this case, several methods of selecting a UE 20 to be associated with the in-vehicle M2M device 30 are considered.

For example, it is considered that a UE 20 to be associated is set in advance or that a UE 20 that is the first UE to successfully have a connection set between the in-vehicle M2M device 30 and the UE 20 is selected. In addition, it is normally considered that the UE 20 carried by the same user, for example, a driver of the vehicle, is likely to communicate with the in-vehicle M2M device 30.

Thus, history records of a UE 20 that previously had a connection set between the UE 20 and the in-vehicle M2M device 30 may be stored in (or learned by) the in-vehicle M2M device 30, and a UE 20 that previously had a connection set between the UE 20 and the in-vehicle M2M device 30 more times may be selected on a priority basis as a UE 20 to be subjected to the connection setting. A method of selecting a UE 20 to be subjected to the connection setting, however, is not limited to the aforementioned methods.

As illustrated by the scenes 7b and 7c illustrated in FIG. 7, when the user moves by the vehicle, the in-vehicle M2M device 30 communicates with the access network 52 through the UE 20 of the user (or performs the relay communication). The relay communication may be performed using a known communication technique such as a tethering function.

Figure 13:
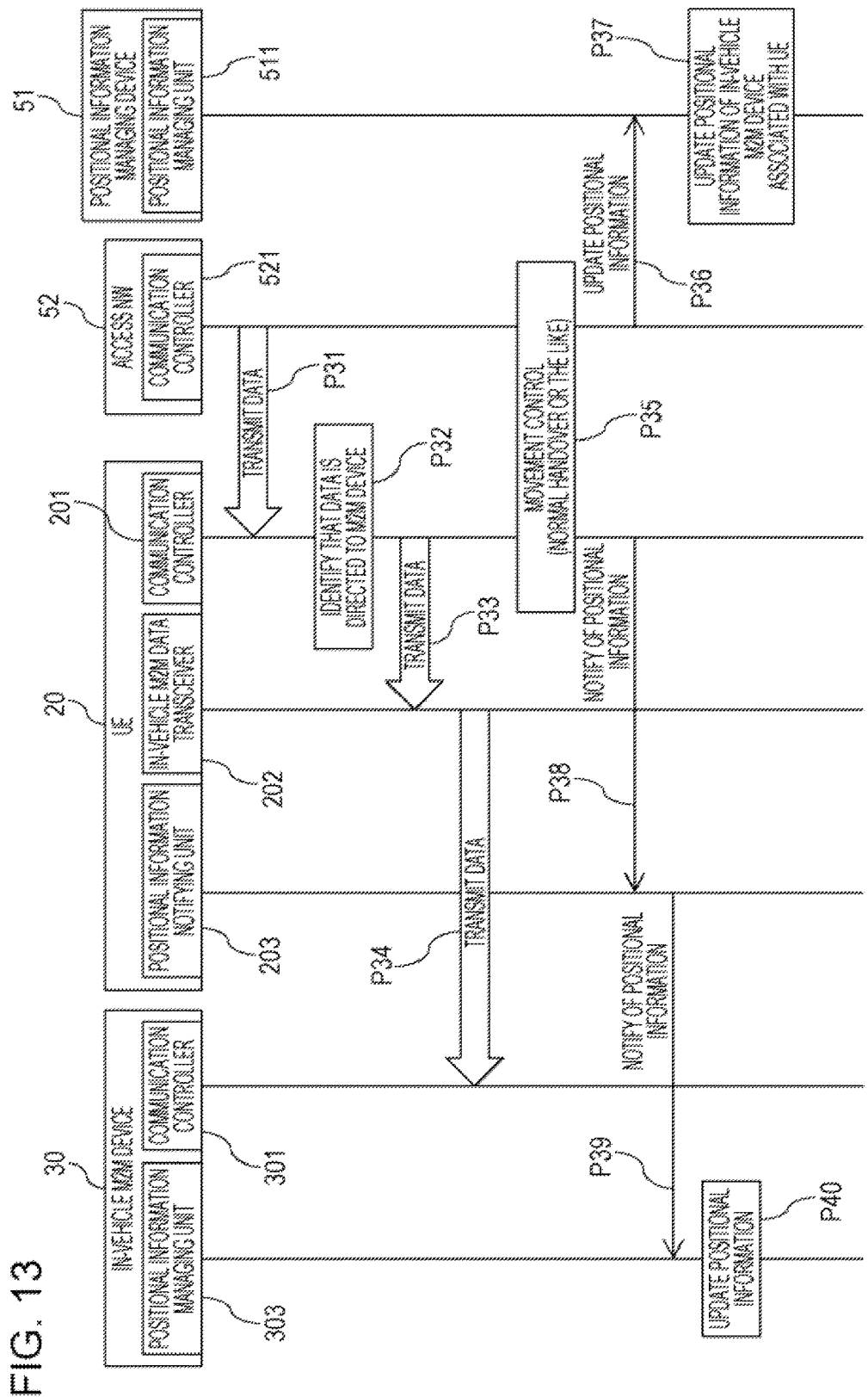
FIG. 13 is a sequence diagram illustrating a communication operation example of a radio communication system illustrated in FIG. 9 in a first use case (when a user moves)

For example, as illustrated in FIG. 13, when the communication controller 521 of the access network 52 has data to be transmitted to the in-vehicle M2M device 30, the communication controller 521 transmits the data to the UE 20 serving as the relay point for the in-vehicle M2M device 30 (in P31). The communication controller 521 may set, in the data, information indicating that the in-vehicle M2M device 30 is a destination of the data.

Upon receiving the data from the access network 52, the communication controller 201 of the UE 20 determines whether the destination of the data is the UE 20 or the in-vehicle M2M device 30 (in P32), for example.

The determination may be performed on the basis of a value of the "Message Type" field of the GTP packet, as illustrated in FIG. 11, for example. If the destination of the data is the in-vehicle M2M device 30 as a result of the determination, the communication controller 201 transmits the received data to the in-vehicle M2M data transceiver 202 (in P33).

The in-vehicle M2M data transceiver 202 transmits the data received from the communication controller 201 to the in-vehicle M2M device 30 (in P34). The data is received by the communication controller 301 of the in-vehicle M2M device 30, for example.

When the in-vehicle M2M device 30 has data to be transmitted to the access network 52, the in-vehicle M2M device 30 transmits the data to the UE 20. The UE 20 may add, to the data received from the in-vehicle M2M device 30, an M2M device ID indicating a source of the data, for example. The in-vehicle M2M data transceiver 202 may add the M2M device ID to the data received from the in-vehicle M2M device 30, for example. Thus, the access network 52 may identify data transmitted from the in-vehicle M2M device 30 from among data received from the UE 20.

After that, it is assumed that movement control such as handover processing between the UE 20 and the access network 52 is performed in response to a movement of the vehicle (in P35). The access network 52 requests the positional information managing device 51 to update the positional information of the UE 20 in response to the movement control performed on the UE 20 (in P36). The request may include the identifier of the UE 20 to be subjected to the updating, for example.

The positional information managing device 51 updates the positional information of the target UE 20 among the positional information (Illustrated in FIG. 12) of the UE 20 in response to the reception of the request to update the positional information from the access network 52 (in P37). FIG. 14 illustrates an example of the update of the positional information management data.

FIG. 14 illustrates a state in which positional information of the M2M device 30 (having the M2M device ID "oooooooo") associated with the UE 20 having the UE ID "aaaaaaaa" is updated together with the update of the positional information of the target UE 20 having the UE ID "aaaaaaaa" to "yyy.yyy.yyy.yyy".

Since the positional information of the M2M device 30 associated with the target UE 20 is also updated together with the update of the positional information of the target UE 20 in response to the movement control performed on the UE 20, the signaling due to a movement of the M2M device 30 may be suppressed. Thus, an increase in the processing load of the access network 52 may be suppressed.

The UE 20 may notify the in-vehicle M2M device 30 of the positional information of the target UE 20 in response to movement control performed between the UE 20 and the access network 52 (in P38). In this case, the positional information notifying unit 203 (refer to FIG. 9) may notify the communication controller 301 of the positional Information of the UE 20, for example.

Upon receiving the notification indicating the positional Information from the UE 20, the in-vehicle M2M device 30 updates a positional information list stored in the in-vehicle M2M device 30 on the basis of the notified positional information (in P39 and P40). The positional Information list may be updated by the positional information managing unit 303 (refer to FIG. 9), for example.

Figures 15, 16:
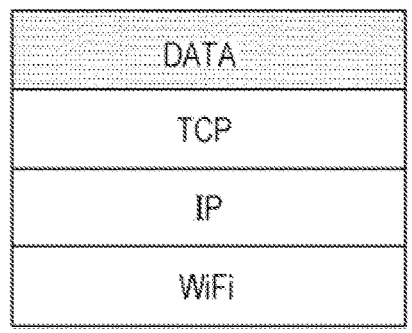
FIG. 15 is a diagram illustrating an example of a positional information list to be managed by an M2M device illustrated in FIG. 9.
FIG. 16 is a diagram illustrating an example of a protocol stack when a UE notifies an M2M device of positional information by WiFi communication in a communication operation example of FIG. 13.

FIG. 15 illustrates an example of the positional information list stored in and managed by the positional Information managing unit 303 of the in-vehicle M2M device 30.

The UE 20 may notify the in-vehicle M2M device 30 of the positional information of the UE 20 without causing data to flow to the access network 52 (and without signaling). Thus, the processing load of the access network 52 may be reduced.

FIG. 16 illustrates an example of a protocol stack when the UE 20 notifies the in-vehicle M2M device 30 of the positional information of the UE 20 by WiFi communication. The positional information notifying unit 203 of the UE 20 may add the positional information of the UE 20 to user data (payload) of the transmission control protocol (TCP) in the example Illustrated in FIG. 16, for example.

Figure 17:
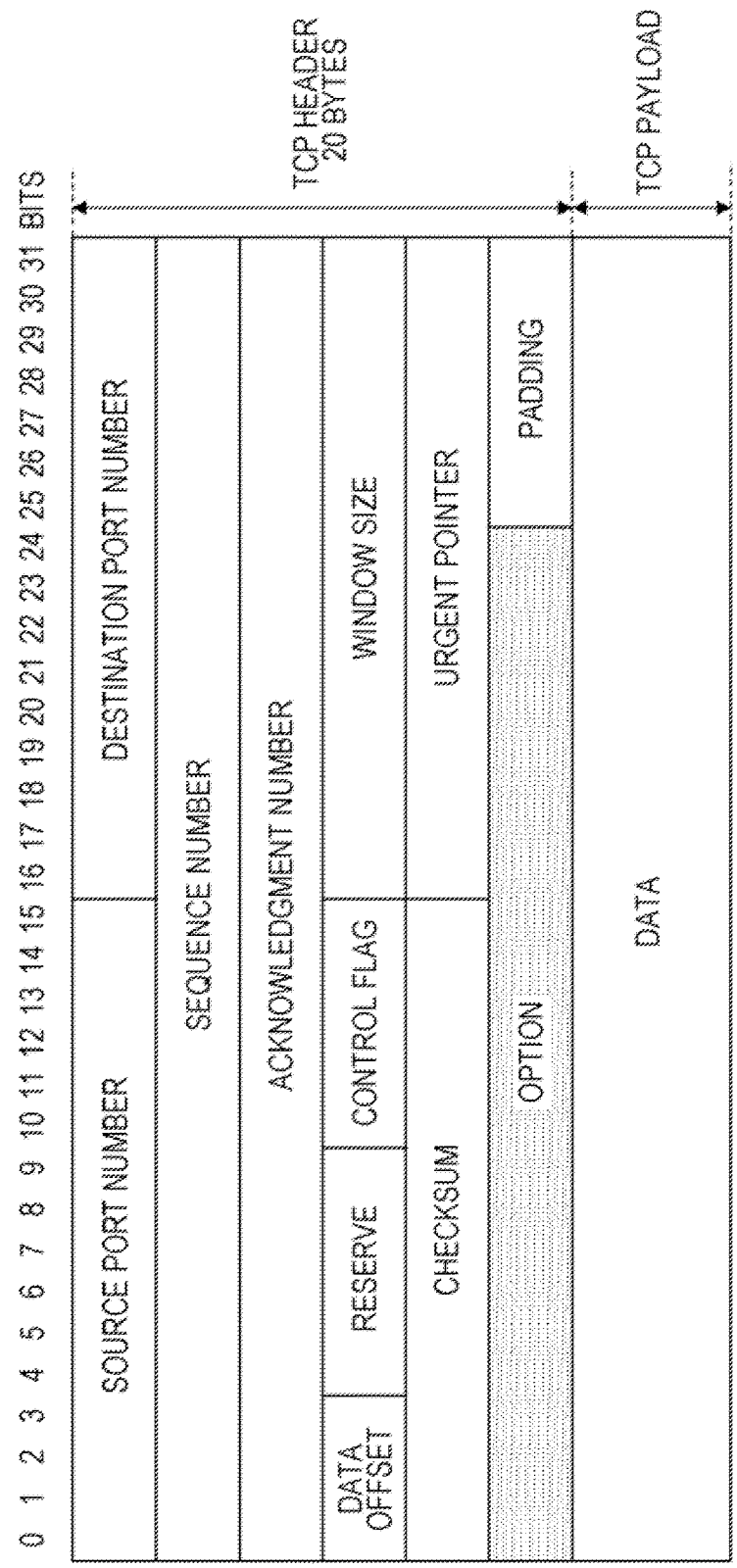
FIG. 17 is a diagram illustrating an example of a format of a TCP header illustrated in FIG. 16.

The fact that the positional information has been added to the user data of TCP may be indicated by adding, to an option field of a TCP header, information (identifier) identifying the addition, as illustrated in FIG. 17, for example.

The in-vehicle M2M device 30 may recognize and acquire the positional information added to the user data of the TCP by terminating the TCP header and detecting that the identifier has been added to the option field.

As described above, the in-vehicle M2M device 30 may manage the identical information as the positional information of the UE 20, which is managed by the positional information managing device 51 in synchronization with the positional information of the UE 20, which is managed by the positional information managing device 51. Thus, even if the relay communication performed through the UE 20 is terminated or disconnected, the in-vehicle M2M device 30 may identify the current positional information of the UE 20 on the basis of the positional information list.

As described later, even if the relay communication performed through the UE 20 is terminated, the in-vehicle M2M device 30 may establish the communication between the in-vehicle M2M device 30 and the access network 52 without newly performing (or skipping) the position registration in the access network 52.

When the in-vehicle M2M device 30 communicates with the access network 52 through the UE 20 serving as the relay point, the UE 20 may control the communication. For example, the communication of the M2M device 30 has characteristics in that "data is periodically transmitted", "data with a small size is transmitted", and "urgent data is not transmitted frequently".

Thus, the UE 20 (for example, the in-vehicle M2M data transceiver 202) serving as the relay point may control the transmission of data from the M2M device 30 on the basis of the aforementioned characteristics. For example, normally, a priority of data (hereinafter also referred to as "M2M data") to be transmitted by the M2M device 30 may be set to be lower than a priority of data (hereinafter also referred to as "UE data") to be transmitted by the UE 20. The index of the priority may be Quality of Service (QoS).

Thus, the UE 20 may control the transmission of data so as to transmit M2M data with a low QoS in the intervals between transmissions of UE data with a high QoS. Therefore, the UE 20 may control the communication of the M2M device 30 without affecting the normal communication of the UE 20.

If M2M data is urgent data (for example, information indicating a failure of the vehicle or the like), a QoS of the M2M data may be set to a level (for example, the highest priority) higher than a QoS of UE data.

Thus, the UE 20 may control the transmission of data so as to transmit the urgent M2M data while prioritizing the urgent M2M data over normal UE data. The M2M device 30 may add information identifying urgency to M2M data so that the UE 20 may identify whether or not the M2M data is urgent data.

Figure 18:
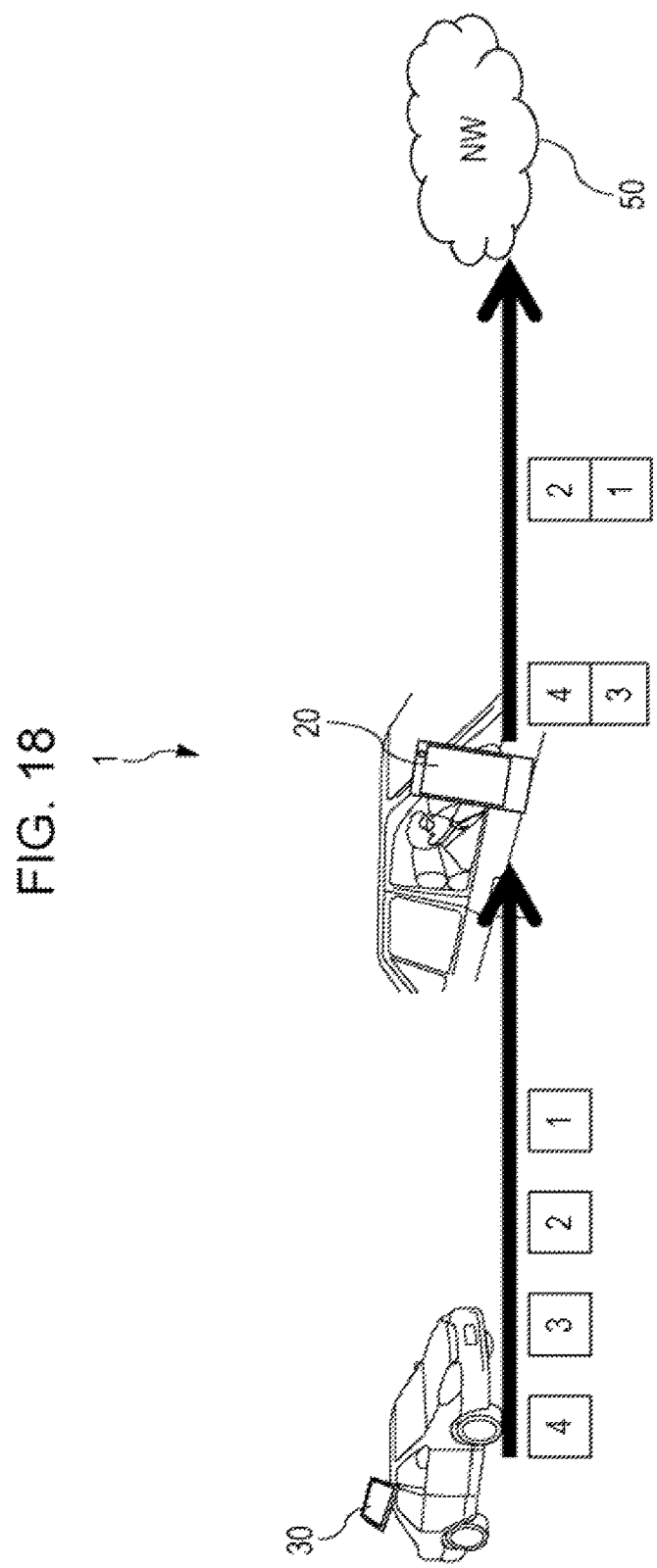
FIG. 18 is a diagram illustrating an example of control to be performed by a UE on data transmitted by an M2M device in a radio communication system illustrated in FIG. 9.

If a radio wave condition around the UE 20 is insufficient, the UE 20 may control intervals at which M2M data is transmitted and thereby reduce a load and congestion of the access network 52. For example, as illustrated in FIG. 18, the UE 20 may detect a reduction in throughput, a reduction in the strength of a received radio wave, or the like. The throughput and the strength of the received radio wave are examples of an index of the quality of a radio signal.

In response to the detection, the UE 20 may temporarily buffer M2M data that is not urgent (or has a relatively low QoS). Then, when the throughput is restored and the UE 20 becomes able to transmit M2M data, the UE 20 may collectively transmit a group of M2M data among the buffered M2M data to the access network 52.

Figure 19:
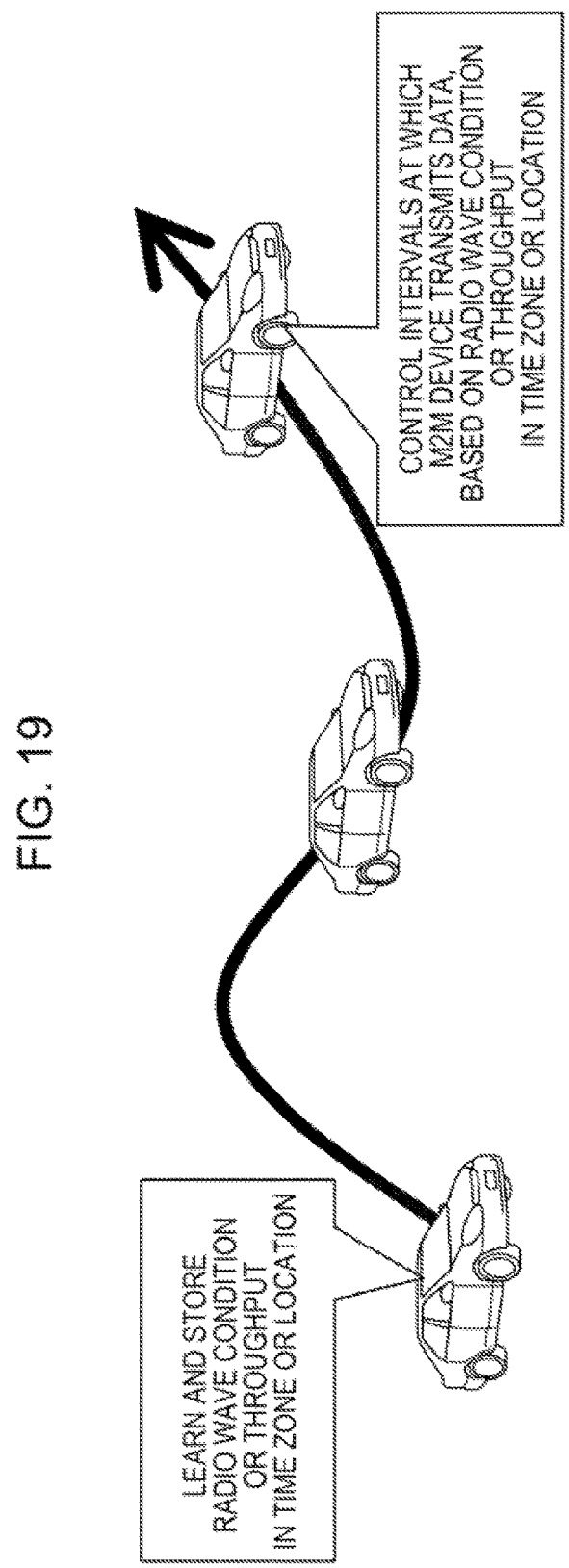
FIG. 19 is a diagram illustrating an example of control to be performed by a UE on data transmitted by an M2M device in a radio communication system illustrated in FIG. 9.

The UE 20 may control the transmission of M2M data on the basis of a radio signal quality such as a radio wave condition, throughput, or the like in each time, each location, or the like. For example, as illustrated in FIG. 19, the UE 20 measures, learns, and stores a radio signal quality in at least one of a time zone and a route (location) in which the user of the UE 20 moves by the vehicle. A method of measuring the radio signal quality is not limited, and an existing measurement technique may be applied to the measurement of the radio signal quality.

The UE 20 may control intervals at which M2M data is transmitted to the access network 52, on the basis of results (or measurement history records) of learning the radio signal quality. Thus, the UE 20 may appropriately control the relay of M2M data on the basis of the time zone, the location, or the like without continuously measuring the radio signal quality. Thus, a processing load and power consumption of the UE 20 may be suppressed.

Figure 20:
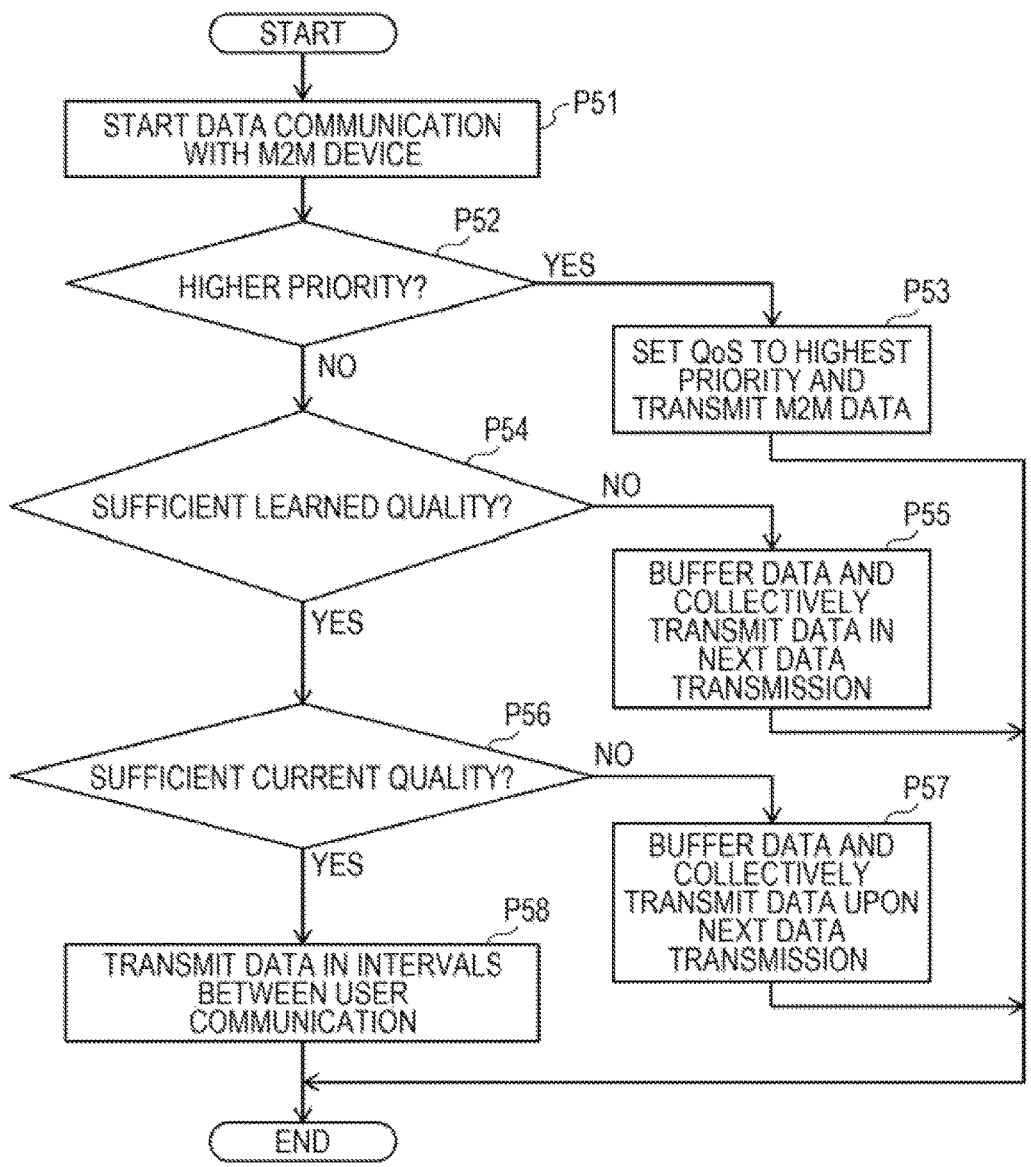
FIG. 20 is a flowchart illustrating an example of control to be performed by a UE on data transmitted by an M2M device in a radio communication system illustrated in FIG. 9.

FIG. 20 illustrates an example of the aforementioned control of the transmission of M2M data by the UE 20 (for example, the in-vehicle M2M data transceiver 202).

As illustrated in FIG. 20, when starting data communication between the UE 20 and the M2M device 30 (in P51), the UE 20 determines whether or not the priority of M2M data is higher than the priority of UE data (in P52).

If the priority of the M2M data is higher than the priority of the UE data as a result of the determination (YES in P52), the UE 20 sets the QoS of the M2M data to the top priority and transmits the M2M data to the access network 52 (in P53), for example.

If the priority of the M2M data is not higher than the priority of the UE data (NO in P52), the UE 20 determines whether or not the radio signal quality in the time zone, the location, or the like learned as illustrated in FIG. 19 is sufficient (in P54). Whether or not the radio signal quality is sufficient may be determined using a predetermined threshold.

If the radio signal quality indicated by the results of the learning is insufficient (NO in P54), the UE 20 temporarily buffers the M2M data and collectively transmits, to the access network 52, the buffered M2M data and M2M data received after the reception of the buffered M2M data (in P55), as illustrated in FIG. 18.

If the radio signal quality indicated by the results of the learning is sufficient (YES in P54), the UE 20 uses a predetermined threshold to determine whether or not the current radio signal quality is sufficient (in P56).

If the current radio signal quality is insufficient (NO in P56), the UE 20 temporarily buffers the M2M data and collectively transmits, to the access network 52, the buffered M2M data and M2M data received after the reception of the buffered M2M data (in P57) as in the same manner as P55.

On the other hand, if the current radio signal quality is sufficient (YES in P56), the UE 20 transmits the M2M data to the access network 52 in the intervals between transmissions of UE data (in P58).

As described above, the UE 20 controls transmission of M2M data on the basis of the priority of the M2M data, results of learning the radio signal quality in the time zone, the location, or the like, the current radio signal quality, and the like. Thus, the UE 20 may appropriately control transmission of the M2M data while reducing an effect on the transmission of UE data, the load of the access network 52, and the like.

In the example illustrated in FIG. 20, the three types of determinations are performed on the basis of the priority of the M2M data, the results of learning the radio signal quality in the time zone, the location, or the like, and the current radio signal quality. Any of the determinations, however, may be omitted.

Next, the communication operation example when the vehicle stops and the user gets out of the vehicle as illustrated in the scenes 7c and 7d illustrated in FIG. 7 is described in detail with reference to a sequence diagram illustrated in FIG. 21.

Upon detecting that the vehicle stops and the user gets out of the vehicle, the in-vehicle M2M device 30 terminates the relay communication performed through the UE 20 and tries to establish the cellular communication between the in-vehicle M2M device 30 and the access network 52.

The in-vehicle M2M device 30 may detect the stop of the engine of the vehicle and thereby detect that the user gets out of the vehicle. Alternatively, the in-vehicle M2M device 30 may detect that the user is separated from the vehicle by a certain distance or more and that the radio link between the in-vehicle M2M device 30 and the UE 20 is disconnected, and thereby detect that the user gets out of the vehicle. A method of detecting that the user gets out of the vehicle, however, is not limited to them.

Upon detecting that the user gets out of the vehicle, the in-vehicle M2M device 30 transmits, to the access network 52, a request to establish the cellular communication (in P61), for example. The request to establish the cellular communication may correspond to an example of a signal indicating that the setting of the connection of the in-vehicle M2M device 30 to the UE 20 is requested to be cancelled. When the cellular communication is normally established, the position registration (sequence) is performed between the M2M device 30 and the access network 52.

In the embodiment, however, the positional information managing device 51 manages the positional information of the in-vehicle M2M device 30 in accordance with the movement control performed on the vehicle (UE 20), and the UE 20 notifies the in-vehicle M2M device 30 of the positional information of the UE 20, as described above.

Thus, the in-vehicle M2M device 30 may establish the cellular communication without newly performing the position registration sequence between the in-vehicle M2M device 30 and the access network 52 (or skipping the position registration sequence). For example, the in-vehicle M2M device 30 includes the M2M device ID of the in-vehicle M2M device 30 into the request to establish the cellular communication and transmits the request to the access network 52.

Upon receiving the request to establish the cellular communication from the in-vehicle M2M device 30, the communication controller 521 of the access network 52 notifies the positional information managing device 51 of the M2M device ID included in the request to establish the cellular communication (in P62).

The positional information association unit 512 of the positional information managing device 51 references, on the basis of the notified M2M device ID, the positional information (positional information management data illustrated in FIG. 14) managed by the positional information managing unit 511, for example.

If an entry in which the M2M device ID is registered exists as a result of the referencing, the positional information association unit 512 deletes the M2M device ID registered in the entry to cancel the association of the M2M device 30 with the UE 20 (in P63).

The positional information association unit 512 registers, as a new mobile device in the positional information managing unit 511, the M2M device 30 whose association has been cancelled. In this case, the positional information association unit 512 registers, as the positional information of the M2M device 30, the positional information of the UE 20 whose association has been cancelled.

FIG. 22 illustrates an example of the update of the positional information management data on the basis of the aforementioned association cancellation. In the example illustrated in FIG. 22, the association of the M2M device 30 having the M2M device ID "ooooooooo" with the UE 20 having the UE ID "aaaaaaaa" is cancelled in an entry of term 1. In an entry of term 7, the M2M device 30 having the M2M device ID "ooooooooo" is registered, and the positional information "yyy.yyy.yyy.yyy" of the UE 20 having the UE ID "aaaaaaaa" is registered as the positional information of the M2M device 30 having the M2M device ID "ooooooooo".

Thus, the M2M device 30 whose association with the UE 20 has been cancelled is managed by the positional information managing device 51 as a mobile device independently communicating with the access network 52.

Figure 21:
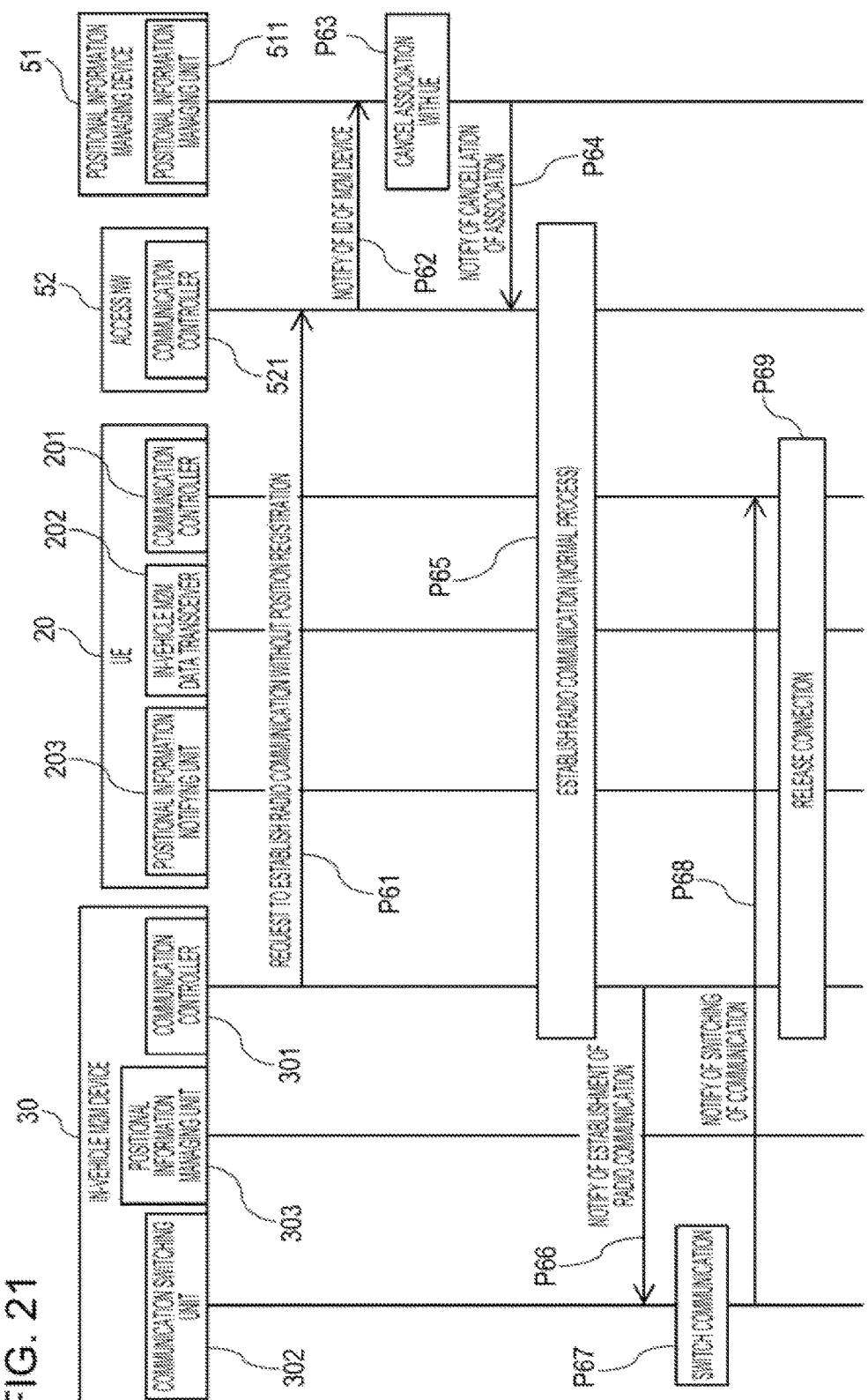
FIG. 21 is a sequence diagram illustrating a communication operation example of a radio communication system illustrated in FIG. 9 in a first use case (when a user gets out of a vehicle)

As illustrated in FIG. 21, upon completing the cancellation of the association of the in-vehicle M2M device 30 and the new registration of the in-vehicle M2M device 30, the positional information managing device 51 transmits an association cancellation notification indicating the completion of the cancellation of the association and the completion of the new registration to the access network 52 (in P64).

Upon receiving the association cancellation notification from the positional information managing device 51, the access network 52 performs normal establishment of the cellular communication between the access network 52 and the in-vehicle M2M device 30 (in P65). The communication controller 521 of the access network 52 and the communication controller 301 of the in-vehicle M2M device 30 may perform the establishment of the cellular communication in cooperation with each other.

When the cellular communication is established, the communication controller 301 of the in-vehicle M2M device 30 notifies the communication switching unit 302 of the establishment of the cellular communication (in P66). The communication switching unit 302 switches the relay communication to the cellular communication in response to the notification (in P67) and transmits a communication switching notification to the UE 20 (in P68).

Upon receiving the communication switching notification from the in-vehicle M2M device 30, the UE 20 releases the connection set between the UE 20 and the in-vehicle M2M device 30 (in P69).

Next, the communication operation example in the second use case illustrated in FIG. 8 is described in detail with reference to FIGS. 23 and 24.

As illustrated by the scene 8a Illustrated in FIG. 8, in the second use case, during the stop of the vehicle (when the engine is in the OFF state), the power supply of the in-vehicle M2M device 30 is also in the OFF state and the cellular communication is not performed between the in-vehicle M2M device 30 and the NW. Thus, a connection is not yet set between the in-vehicle M2M device 30 and the access network 52.

Figure 23:
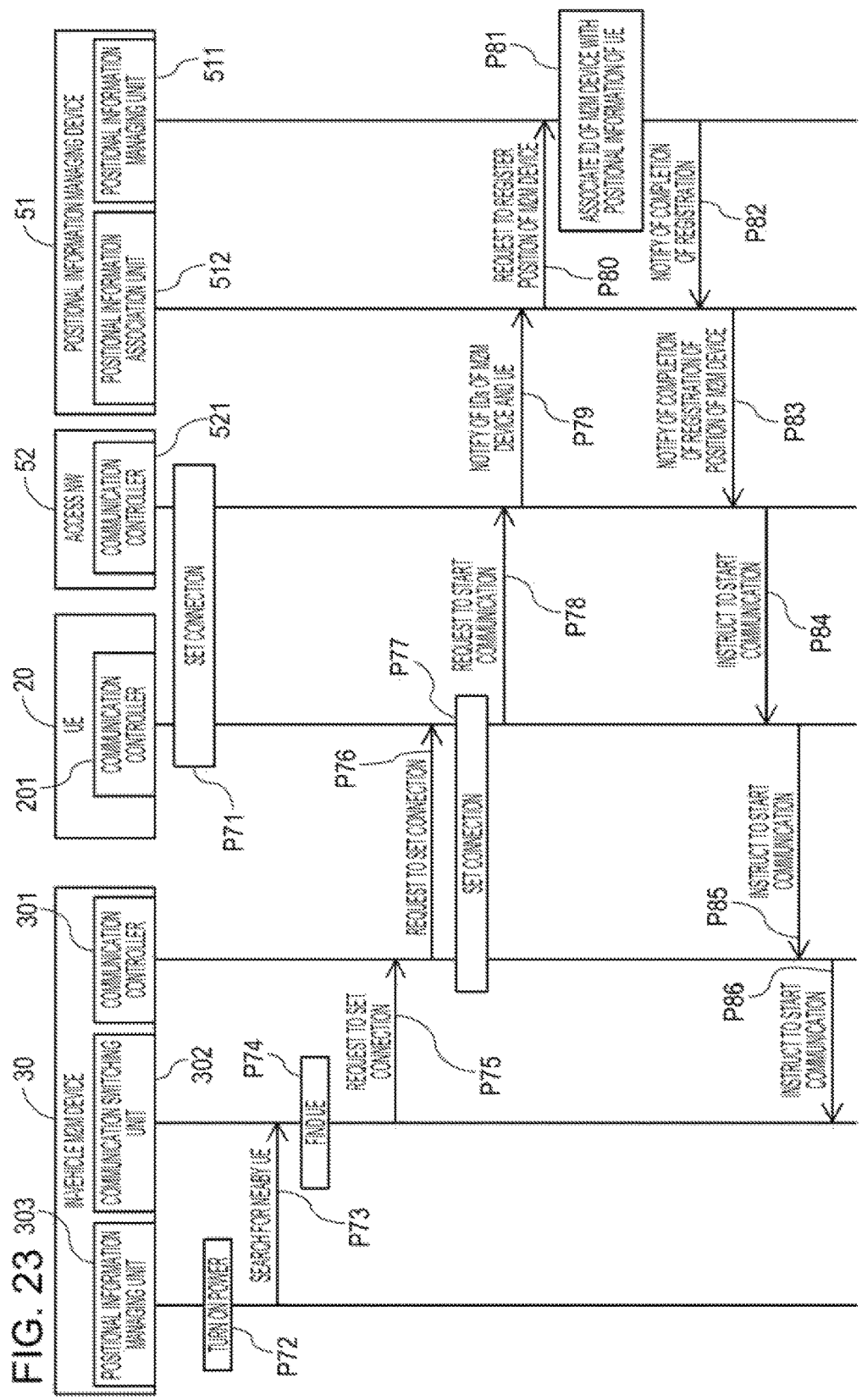
FIG. 23 is a sequence diagram illustrating a communication operation example of a radio communication system illustrated in FIG. 9 in a second use case (when a user gets in a vehicle)

It is assumed that a connection is already set between the UE 20 carried by the user of the vehicle and the access network 52, as illustrated in FIG. 23 (in P71).

The in-vehicle M2M device 30 searches and determines, in response to wake-up of the in-vehicle M2M device 30, whether or not a UE 20 to which the in-vehicle M2M device 30 is able to be connected (connection setting) exists around the in-vehicle M2M device 30 (in P72 and P73). The positional information managing unit 303 and the communication switching unit 302 may search for the UE 20 in response to the wake-up in cooperation with each other, for example.

For example, the positional information managing unit 303 may transmit, to the communication switching unit 302, a request to search for the UE 20 existing around the in-vehicle M2M device 30 in response to the wake-up of the in-vehicle M2M device 30, and the communication switching unit 302 may search for the UE 20 existing around the in-vehicle M2M device 30 in accordance with the request to search for the UE 20. A method of searching for the UE 20 existing around the in-vehicle M2M device 30 is not limited. For example, a known terminal discovery technique or the like may be applied to the method of searching for the UE 20 existing around the in-vehicle M2M device 30.

The "wake-up" of the in-vehicle M2M device 30 occurs when the power supply of the in-vehicle M2M device 30 is turned on or when the in-vehicle M2M device 30 recovers from the sleep mode. The in-vehicle M2M device 30 may be woken up when the engine of the vehicle is turned on, for example. The wake-up of the in-vehicle M2M device 30, however, is not limited to this.

Upon the wake-up of the M2M device 30, the position registration sequence is performed normally. Upon the wake-up, however, the M2M device 30 according to the embodiment searches for the UE 20 existing around the M2M device 30 and tries to set a connection between the M2M device 30 and the found UE 20. Thus, the position registration sequence to be performed upon the wake-up of the in-vehicle M2M device 30 may be reduced and the load of the access network 52 may be reduced.

Upon finding the UE 20 carried by the user staying in the vehicle in the search for the UE 20 existing around the in-vehicle M2M device 30 (in P74), the in-vehicle M2M device 30 transmits, to the found UE 20, a request to set a connection (in P75 and P76). The request to set the connection may be generated by the communication switching unit 302 and transmitted by the communication controller 301 to the UE 20, for example.

Upon receiving the request to set the connection from the in-vehicle M2M device 30, the UE 20 sets the connection between the UE 20 and the in-vehicle M2M device 30 that is a source of the request to set the connection (in P77). The communication controller 201 of the UE 20 and the communication controller 301 of the in-vehicle M2M device 30 may set the connection in cooperation with each other, for example.

When the connection setting is completed, the in-vehicle M2M device 30 becomes able to directly communicate with the UE 20. WiFi communication, Bluetooth (registered trademark) communication, or the like may be applied to the direct communication between the in-vehicle M2M device 30 and the UE 20. The direct communication between the in-vehicle M2M device 30 and the UE 20, however, is not limited to them.

After the completion of the connection setting, processing similar to that in P17 to P25 illustrated in FIG. 10 may be performed in P78 to P86 in which "request to start communication" and "instruction to start communication" are provided instead of "request to switch the communication" and "instruction to switch the communication", respectively.

For example, as illustrated in FIG. 23, when the connection is set between the in-vehicle M2M device 30 and the UE 20, the UE 20 may transmit the request to start the communication to the access network 52 (in P78). The request to start the communication is an example of a signal indicating that the in-vehicle M2M device 30 requests the start of the communication to be performed through the UE 20.

The request to start the communication may be generated by the communication controller 201 and may include the identifiers of the UE 20 and in-vehicle M2M device 30, for example. In other words, the request to start the communication is an example of a signal that notifies the access network 52 of the M2M device ID and the UE ID.

The request to start the communication that is the example of the signal notifying the access network 52 of the M2M device ID and the UE ID may be transmitted with a user plane signal, like the aforementioned request to switch the communication, for example. The user plane signal may be a GTP packet (refer to FIG. 11).

In this example, since the user plane signal (for example, the GTP packet) is used to notify the access network 52 of the M2M device ID, the new signaling using a control plane signal may be suppressed and the processing load of the access network 52 may be reduced.

Upon receiving the user plane signal having the UE ID and M2M device ID added thereto from the UE 20, the access network 52 notifies the positional information managing device 51 of the added IDs (in P79). The communication controller 521 of the access network 52 may notify the positional information managing device 51 of the IDs.

Upon receiving the M2M device ID and the UE ID, the positional information managing unit 511 of the positional information managing device 51 associates the notified M2M device ID with the positional information of the UE 20, which is intrinsically managed by the positional information managing unit 511 to registers and manage the M2M device ID (in P80 and P81). An example of the positional information management data may be the same as data illustrated in FIG. 12.

Upon completing the registration (association) of the M2M device ID, the positional information managing device 51 transmits a registration completion notification to the access network 52 (in P82 and P83).

Upon receiving the registration completion notification from the positional information managing device 51, the access network 52 (communication controller 521) transmits, to the UE 20, a communication start instruction indicating that the in-vehicle M2M device 30 may start the communication through the UE 20 (in P84).

Upon receiving the communication start instruction from the access network 52, the communication controller 201 of the UE 20 transmits a communication start instruction to the communication controller 301 of the in-vehicle M2M device 30 (in P85), for example.

Upon receiving the communication start instruction from the UE 20, the communication controller 301 of the in-vehicle M2M device 30 transmits the communication start instruction to the communication switching unit 302 (in P86). Then, the communication switching unit 302 starts the communication with the access network 52 through the UE 20 serving as the relay point.

As Illustrated by the scenes 8b and 8c illustrated in FIG. 8, when the user moves by the vehicle, the in-vehicle M2M device 30 communicates with the access network 52 through the UE 20 of the user (relay communication). A known communication technique such as the tethering function may be used for the relay communication.

A relay communication sequence and a sequence of updating the positional information of the UE 20 and in-vehicle M2M device 30 in accordance with movement control such as handover performed in response to a movement of the vehicle (UE 20) in the second use case may be the same as or similar to the sequences that are performed in the first use case (refer to, for example, FIG. 13).

In addition, a method of notifying the in-vehicle M2M device 30 of the positional information of the UE 20 by the UE 20 and a method of controlling the transmission of M2M data by the UE 20 in the relay communication may be the same as or similar to the methods performed in the first use case (refer to, for example, FIGS. 14 to 20).

Next, the communication operation example when the vehicle stops and the user gets out of the vehicle in the second use case, as illustrated by the scenes 8c and 8d illustrated in FIG. 8, is described in detail with reference to a sequence diagram of FIG. 24.

Upon detecting that the vehicle stops and the user gets out of the vehicle, the in-vehicle M2M device 30 terminates the relay communication performed through the UE 20. For example, the in-vehicle M2M device 30 may detect the stop of the engine of the vehicle and thereby detect that the user gets out of the vehicle. Alternatively, the in-vehicle M2M device 30 may detect that the user is separated from the vehicle by a certain distance or more and that the radio link between the in-vehicle M2M device 30 and the UE 20 is disconnected, and thereby detect that the user gets out of the vehicle. A method of detecting that the user gets out of the vehicle, however, is not limited to them.

In the second use case, the power supply of the in-vehicle M2M device 30 may be turned off in response to the completion of the communication or the in-vehicle M2M device 30 may transition to the sleep mode in response to the completion of the communication and may not perform the cellular communication. Thus, the in-vehicle M2M device 30 does not set a connection in order to establish the cellular communication.

As described above, on the basis of the movement control performed on the vehicle (UE 20), the positional information managing device 51 manages the positional information of the in-vehicle M2M device 30 and the UE 20 notifies the in-vehicle M2M device 30 of the positional information of the UE 20.

Thus, the in-vehicle M2M device 30 may not newly perform the position registration sequence between the in-vehicle M2M device 30 and the access network 52 in order to transmit a signal to the access network 52 (or may skip the position registration sequence).

For example, upon detecting that the user gets out of the vehicle, the in-vehicle M2M device 30 may skip the position registration sequence and transmit a communication completion notification to the access network 52 before the power supply of the in-vehicle M2M device 30 is turned off or the in-vehicle M2M device 30 transitions to the sleep mode (in P91). The communication completion notification may be generated by the communication controller 301 and may include the M2M device ID, for example. The communication completion notification may correspond to an example of a signal indicating that the setting of the connection of the in-vehicle M2M device 30 to the UE 20 is cancelled.

Upon receiving the communication completion notification from the in-vehicle M2M device 30, the communication controller 521 of the access network 52 notifies the positional information managing device 51 of the M2M device ID included in the communication completion notification (in P92).

The positional information association unit 512 of the positional information managing device 51 references, on the basis of the notified M2M device ID, the positional information (for example, the positional information management data illustrated in FIG. 14) managed by the positional information association unit 512, for example.

If an entry in which the M2M device ID is registered exists as a result of the referencing, the positional information association unit 512 deletes the M2M device ID registered in the entry to cancel the association of the M2M device 30 with the UE 20 (in P93).

FIG. 25 illustrates an example of the update of the positional information management data on the basis of the aforementioned cancelation of the association. In the example illustrated in FIG. 25, the association of the M2M device 30 having the M2M device ID "oooooooo" with the UE 20 having the UE ID "aaaaaaaa" is cancelled in an entry of term 1. In the entry of term 7, the M2M device 30 having the M2M device ID "oooooooo" is registered, and the positional information "yyy.yyy.yyy.yyy" of the UE 20 having the UE ID "aaaaaaaa" is registered as the positional information of the M2M device 30 having the M2M device ID "oooooooo".

Thus, the M2M device 30 whose association with the UE 20 has been cancelled is managed by the positional information managing device 51 as a mobile device that is able to independently communicate with the access network 52.

Figure 24:
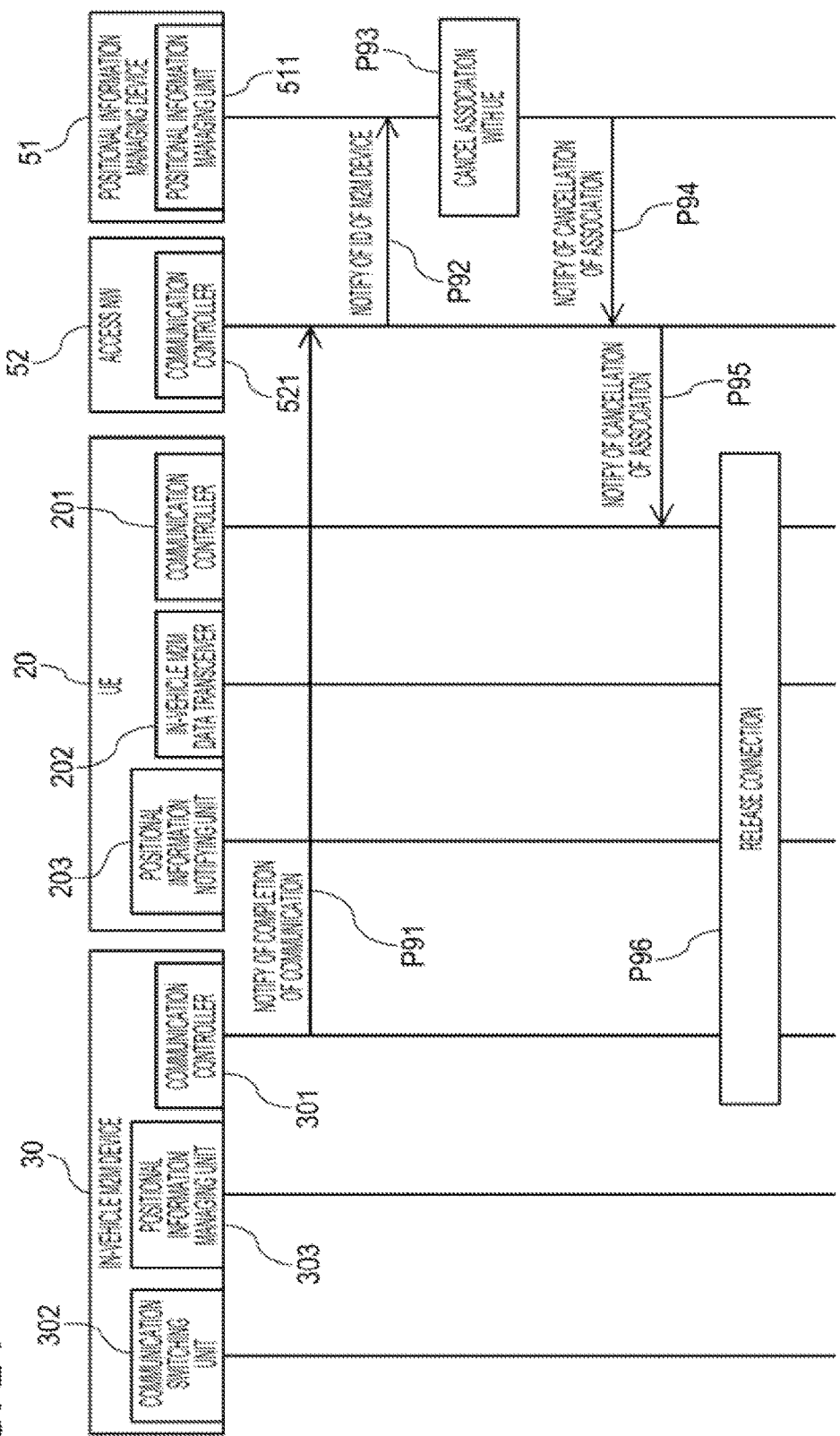
FIG. 24 is a sequence diagram illustrating a communication operation example of a radio communication system illustrated in FIG. 9 in a second use case (when a user gets out of a vehicle)

As illustrated in FIG. 24, upon completing the cancellation of the association of the in-vehicle M2M device 30 and the new registration of the in-vehicle M2M device 30, the positional information managing device 51 transmits an association cancellation notification indicating the completion of the cancellation of the association and the completion of the new registration to the access network 52 (in P94).

Upon receiving the association cancellation notification from the positional information managing device 51, the access network 52 transmits the association cancellation notification to the UE 20 (in P95).

In response to the reception of the association cancellation notification from the access network 52, the UE 20 may release the setting of the connection between the UE 20 and the in-vehicle M2M device 30 (in P96).

The communication controller 201 of the UE 20 and the communication controller 301 of the in-vehicle M2M device 30 may release the connection setting in cooperation with each other, for example.

In the aforementioned first and second use cases, it is considered that the vehicle stops and the user gets out of the vehicle in a state in which the engine is in the ON state. In this case, the in-vehicle M2M device 30 may try to establish the cellular communication between the in-vehicle M2M device 30 and the access network 52 in response to the disconnection of the radio link (connection setting) between the in-vehicle M2M device 30 and the UE 20 (refer to, for example, FIG. 21).

In the aforementioned first and second use cases, multiple users who each carry a UE 20 may get in the single vehicle. In this case, before trying to establish the cellular communication, the in-vehicle M2M device 30 may try to be connected to a UE 20 other than a UE 20 of which a radio link has been disconnected.

As described above, according to the aforementioned embodiment, since not all of in-vehicle M2M devices 30 individually have a radio resource assigned thereto, the efficiency of using radio resources may be improved.

Since the positional information of the UE 20 that moves with the in-vehicle M2M device 30 is associated with the identifier of the in-vehicle M2M device 30 and managed, the signaling due to the individual movement control performed on the in-vehicle M2M device 30 may be suppressed.

In addition, even when the in-vehicle M2M device 30 terminates the relay communication between the in-vehicle M2M device 30 and the access network 52 through the UE 20, the in-vehicle M2M device 30 may skip the position registration and establish the cellular communication. Thus, the signaling related to the position registration may be suppressed.

Thus, the load (the amount of radio resources to be consumed and the number of times when the signaling is performed) of the access network 52 may be reduced.

Next, an example of hardware configurations of the UE 20 and M2M device 30 is described with reference to FIG. 26.

Figure 26:
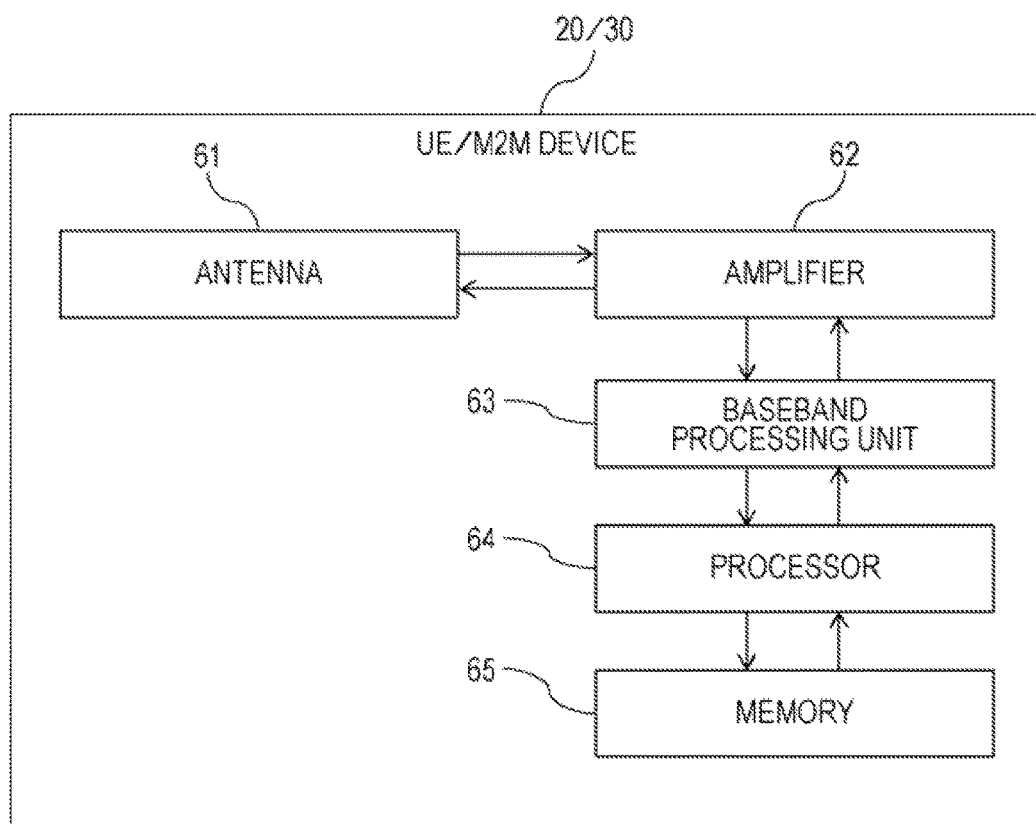
FIG. 26 is a diagram illustrating an example of hardware configuration of a UE and an M2M device illustrated in FIGS. 1, 2, and 9.

As Illustrated in FIG. 26, the UE 20 includes an antenna 61, an amplifier 62, a baseband processing unit 63, a processor 64, and a memory 65, for example. An example of the configuration of the M2M device 30 may be the same as or similar to the example of the configuration of the UE 20 illustrated in FIG. 26. The M2M device 30, however, may additionally include a sensor, measurer, and the like communicably connected to processor 64, for example.

The antenna 61 transmits and receives a radio signal. The antenna 61 may be used for transmission and reception or may have an antenna part for transmission and an antenna part for reception.

The amplifier 62 amplifies a radio signal received from the baseband processing unit 63 and transmits the amplified radio signal to the antenna 61. In addition, the amplifier 62 amplifies a radio signal received by the antenna 61 and transmits the amplified radio signal to the baseband processing unit 63. The amplifier 62 may be used for transmission and reception or may have an amplifying part for transmission and an amplifying part for reception. The amplifying part for transmission that is included in the amplifier 62 may be a power amplifier (PA), for example. The amplifying part for reception that is included in the amplifier 62 may be a low-noise amplifier (LNA), for example.

The baseband processing unit 63 modulates a transmission signal generated by the processor 64 and outputs the modulated signal to the amplifier 62, for example. In addition, the baseband processing unit 63 demodulates a signal received from the amplifier 62 and outputs the demodulated signal to the processor 64, for example.

An orthogonal frequency division multiplexing (OFDM) modulation and demodulation technique may be applied to the modulation of the transmission signal and the demodulation of the received signal. Baseband processing by the baseband processing unit 63 may include processing such as error-correction encoding, error-correction decoding, channel estimation, and channel compensation (equalization).

The baseband processing unit 63 may be achieved using a digital signal processor (DSP), a large-scale integrated (LSI) circuit, a field programmable gate array (FPGA), or the like, for example.

The processor 64 operates, by reading information stored in the memory 65, to comprehensively control the operations of the UE 20. Thus, the processor 64 may correspond to an example of the controller of the UE 20 (or M2M device 30). The processor 64 is an example of a processor device or processor circuit that has computing power. For example, a central processing unit (CPU) may be applied to the processor 64.

The memory 65 is an example of a storage device that stores therein the information that may be read by the processor 64. For example, a random access memory (RAM) or a hard disc drive (HDD) may be applied to the memory 65. The information stored in the memory 65 may include a program (also referred to as "software") and data. The program may include a program to be executed to control the operations of the UE 20 (or M2M device 30).

For example, the operations (functions) of the units 201 to 203 (or 301 to 303) illustrated in FIG. 9 are achieved by causing the processor 64 to read the program for controlling the operations of the UE 20 from the memory 65 and execute the program.

The data stored in the memory 65 may include data attached to the program and include data and information that are used in response to the operations of the aforementioned units 201 to 203 (or 301 to 303).

For example, data (UE data or M2M data) that is transmitted and received between the UE 20 (or M2M device 30) and the access network 52 may be buffered in the memory 65. The memory 65 of the M2M device 30 may store the positional information list illustrated in FIG. 15, while the memory 65 of the UE 20 may store information such as the results (described above with reference to FIGS. 19 and 20) of learning the radio signal quality in the time or the location, and the threshold to be used to determine the radio signal quality.

Next, an example of a hardware configuration of the positional information managing device 51 is described with reference to FIG. 27.

Figure 27:
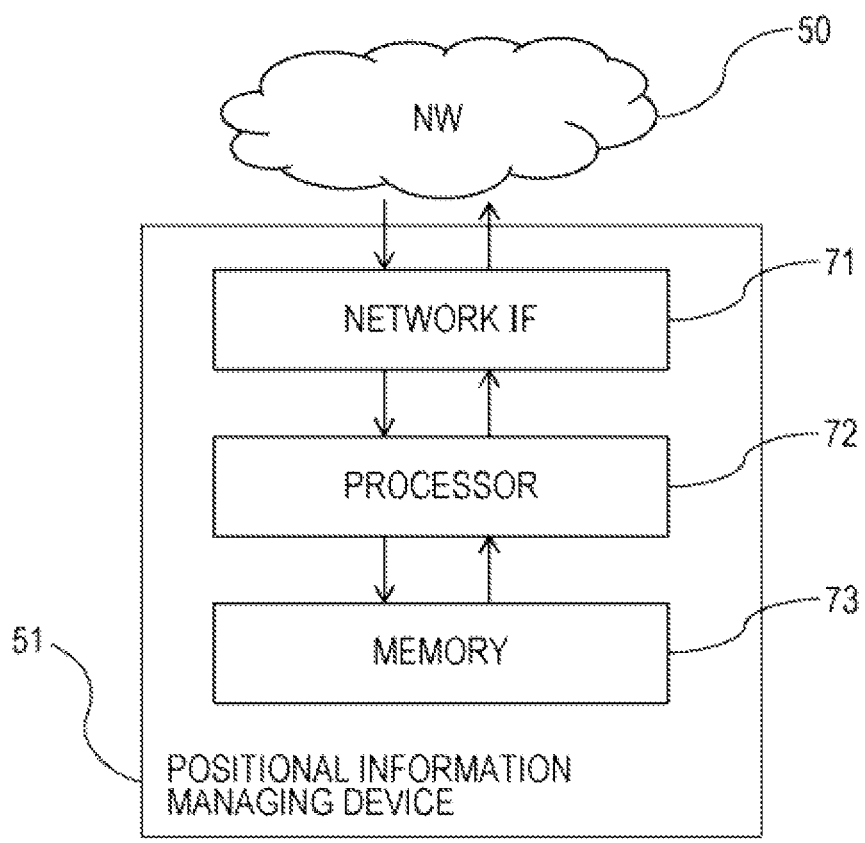
FIG. 27 is a diagram illustrating an example of a hardware configuration of a positional information managing device illustrated in FIGS. 1, 2, and 9.

As Illustrated in FIG. 27, the positional information managing device 51 includes a network interface (IF) 71, a processor 72, and a memory 73, for example.

The network IF 71 is an interface that enables communication with the access network 52, for example. The network IF 71 may convert protocols of signals that are transmitted and received between the positional information managing device 51 and the aforementioned SGW and PGW, for example. The signals are transmitted and received through the network IF 71 in order to manage the aforementioned positional information.

The processor 72 operates, by reading information stored in the memory 73, to comprehensively control the operations of the positional information managing device 51.

Thus, the processor 72 may correspond to an example of a controller included in the positional information managing device 51. The processor 72 is an example of a processor device or processor circuit that has computing power. For example, a CPU may be applied to the processor 72.

The memory 73 is an example of a storage device that stores the information that may be read by the processor 72. For example, a RAM or an HDD may be applied to the memory 73. The information stored in the memory 73 may include a program and data, while the program may include a program to be executed to control the operations of the positional information managing device 51.

For example, the operations (functions) of the positional information managing unit 511 and positional information association unit 512 illustrated in FIG. 9 are achieved by causing the processor 72 to read the program for controlling the operations of the positional information managing device 51 from the memory 73 and execute the program.

The data stored in the memory 73 may include data attached to the program and include data and information that are used in response to the operations of the aforementioned units 511 and 512.

For example, data (UE data or M2M data) that is transmitted and received between the positional information managing device 51 and the access network 52 may be buffered in the memory 73. In addition, the positional information management data illustrated in FIGS. 12, 14, 22, and 25 may be stored in the memory 73.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A positional information management device, comprising:
    a memory;
    a network interface used for a communicating with a first mobile device through a network; and
    a processor coupled to the memory, and the processor being configured to:
    store positional information of the first mobile device communicating with a base station;
    store the positional information of the first mobile device as positional information of a second mobile device in response to detecting a coupling between the first mobile device and the second mobile device;
    utilize the positional information of the first mobile device as the positional information of the second mobile device when the first mobile device is coupled to the second mobile device; and
    suppress a connection between the second mobile device and the positional information management device when the positional information is utilized, wherein:
    a setting of the coupling between the first mobile device and the second mobile device is used to control transmission of data from the first mobile device to a network through the second mobile device; and
    intervals at which the data is transmitted are controlled based on a priority of the data.

2. The positional information managing device according to claim 1, wherein
    the processor is further configured to
    update the first positional information in response to a movement of the first mobile device.

3. The positional information managing device according to claim 1, wherein
    the processor is further configured to
    cancel an association of device information of a second mobile device connected to the first mobile device with the first positional information upon receiving a signal indicating that a setting of the coupling of the second mobile device to the first mobile device is cancelled.

4. The positional information managing device according to claim 1, wherein
    the processor is further configured to
    register, as positional information of a second mobile device, the first positional information at a time of cancellation of an association of device information of the second mobile device connected to the first mobile device with the first positional information.

5. The positional information managing device according to claim 1, wherein
    the processor is further configured to
    receive the device information through the network, the device information being included in user data used in the communication performed between the second mobile device and the network through the first mobile device.

6. A mobile terminal coupled to a base station, the mobile terminal comprising:
    a memory;
    a network interface used for a communicating with a mobile device through a network; and
    a processor coupled to the memory and the processor configured to:
    set a coupling between the mobile terminal and the mobile device; and
    transmit, to a positional information management device, information including an identifier of the mobile terminal and an identifier of the mobile device in response to the setting of the coupling, the positional information management device storing positional information of the mobile terminal and the positional information of the mobile device;
    perform a control so that the positional information of the mobile terminal is utilized as the positional information of the mobile device when the mobile terminal is coupled to the mobile device, wherein a connection between the mobile device and the positional information management device is suppressed when the positional information is utilized;
    use the setting of the coupling to control transmission of data from the mobile device to a network through the mobile terminal; and
    control, on basis of a priority of the data, intervals at which the data is transmitted.

7. The mobile terminal according to claim 6, wherein
    the processor is further configured to notify the positional information managing device and the mobile device of positional information of the mobile terminal in response to a movement of the mobile terminal.

8. The mobile terminal according to claim 7, wherein
    the processor is further configured to notify the mobile device of the positional information by including the positional information in user data used in a communication performed between the mobile terminal and the mobile device.

9. The mobile terminal according to claim 6, wherein the processor is further configured to control intervals at which the data is transmitted, on basis of a history record regarding measurement of quality of a radio signal in at least one of a time zone and a location in which the mobile terminal has moved.

10. The mobile terminal according to claim 6, wherein the processor is further configured to:
transmit, to the positional information managing device, a signal indicating that the setting of the coupling between the mobile device and the mobile terminal is to be canceled,
receive, from the positional information managing device, a notification indicating cancellation of an association between the mobile device and the mobile terminal, and
cancel the setting of the coupling between the mobile device and the mobile terminal in response to the reception of the notification.

11. A mobile device, comprising:
a memory;
a network interface used for a communicating with a mobile terminal through a network; and
a processor coupled to the memory and the processor configured to:
  set a coupling between the mobile device and the mobile terminal that communicates with a network, and
  transmit information of the mobile device through the mobile terminal to a positional information management device in response to the setting of the coupling, the positional information management device storing positional information of the mobile terminal and the positional information of the mobile device; and
receive the positional information of the mobile terminal, wherein:
both the mobile device and the positional information management device utilize the positional information of the mobile terminal as the positional information of the mobile device when the mobile device is coupled to the mobile terminal;
  a setting of the coupling is used to control transmission of data from the mobile device to a network through the mobile terminal; and
  intervals at which the data is transmitted are controlled based on a priority of the data.

12. The mobile device according to claim 11, wherein the processor is further configured to:
utilize positional information of the mobile terminal, the positional information being notified by the mobile terminal in response to a movement of the mobile terminal, and
control establishment of a communication with the network on basis of the positional information.

13. The positional information management device according to claim 1, wherein
the processor is further configured to
  control the second mobile device not to transmit information for notifying position of the second mobile device to the positional information management device when the first mobile device is coupled to the second mobile device.

* * * * *